United States Patent [19]

McKenna

[11] Patent Number: 5,205,677
[45] Date of Patent: Apr. 27, 1993

[54] FRUIT HARVESTING MACHINE

[75] Inventor: Frank J. McKenna, Shaker Heights, Ohio

[73] Assignee: Kathleen McKenna, Shaker Hts., Ohio

[21] Appl. No.: 685,592

[22] Filed: Apr. 12, 1991

Related U.S. Application Data

[63] Continuation-in-part of Ser. No. 550,811, Jul. 10, 1990, Pat. No. 5,007,772, which is a continuation of Ser. No. 261,337, Oct. 24, 1988, abandoned.

[51] Int. Cl.$^5$ .......................... B60P 1/60; B65G 51/18; B65G 53/52; B65G 53/54
[52] U.S. Cl. .......................................... 406/39; 406/40; 406/191; 406/195; 414/508; 56/328.1
[58] Field of Search .............. 406/39, 40, 41, 151, 406/191, 195; 414/508, 469, 486, 501, 537, 538; 56/328.1; 285/165, 406, 903; 193/7, 25 E

[56] References Cited

U.S. PATENT DOCUMENTS

| | | | |
|---|---|---|---|
| 1,114,318 | 10/1914 | Vasey | 193/7 |
| 1,504,846 | 8/1924 | Tarkington . | |
| 2,450,152 | 9/1948 | Miller | 414/508 |
| 2,471,326 | 5/1949 | Hoyt, Sr. . | |
| 2,473,587 | 6/1949 | Huston . | |
| 2,502,810 | 4/1950 | Waters . | |
| 2,576,991 | 12/1951 | Bainbridge et al. . | |
| 2,584,361 | 2/1952 | Morine . | |
| 2,782,943 | 2/1957 | Jones et al. . | |
| 2,821,312 | 1/1958 | Wiegel | 414/508 |
| 2,973,112 | 2/1961 | Young | 414/508 |
| 3,329,290 | 7/1967 | Lowery | 414/508 |
| 3,475,888 | 11/1969 | Staats, Sr. et al. | 56/328 |
| 3,523,404 | 8/1970 | Girardi | 414/508 X |
| 3,633,336 | 1/1972 | Rempel . | |
| 3,666,126 | 5/1972 | Rempel . | |
| 3,878,957 | 4/1975 | Rempel | 414/486 |
| 4,395,867 | 8/1983 | Cooper et al. | 56/327 |
| 4,736,574 | 4/1988 | Walker | 56/238 |
| 5,007,772 | 4/1991 | McKenna et al. | 406/39 |

OTHER PUBLICATIONS

Tree Spacing Studies: how close is close? by J. Fisher, *The Citrus Industry*, Feb. 1990, pp. 34-44.

Primary Examiner—Russell D. Stormer
Assistant Examiner—James M. Kannofsky
Attorney, Agent, or Firm—Calfee, Halter & Griswold

[57] ABSTRACT

A machine for harvesting fruit from trees is provided. The machine includes a supporting vehicle; a hopper mounted on the vehicle; a blower assembly for maintaining a sub-atmospheric pressure in the hopper; an extendable/retractable boom rotatably mounted on the vehicle; a worker-supporting bucket attached to the outer end of the boom; and a conduit system extending from the bucket, through the boom, and into the hopper whereby the fruit may be transferred from the bucket to the hopper. The boom includes inner, middle and outer telescopically slidable boom sections; while the conduit system includes inner, middle and outer telescopically slidable conduit sections. The machine further includes a first deflection-preventing member which is mounted on the inner end of the middle boom section and a second deflection-preventing member mounted on the inner end of the outer boom section. In one embodiment, the second deflection-preventing member includes a pivotally mounted plate-shape main body portion which has an arcuate edge sized to form a cradle for the middle conduit section. In another embodiment, the second deflection-preventing member includes a spool-shaped elastomeric body supported on a shaft. In still another embodiment, the second deflection-preventing member includes a plate-shape main body portion having an arcuate edge sized to form a cradle for the outer conduit section.

20 Claims, 19 Drawing Sheets

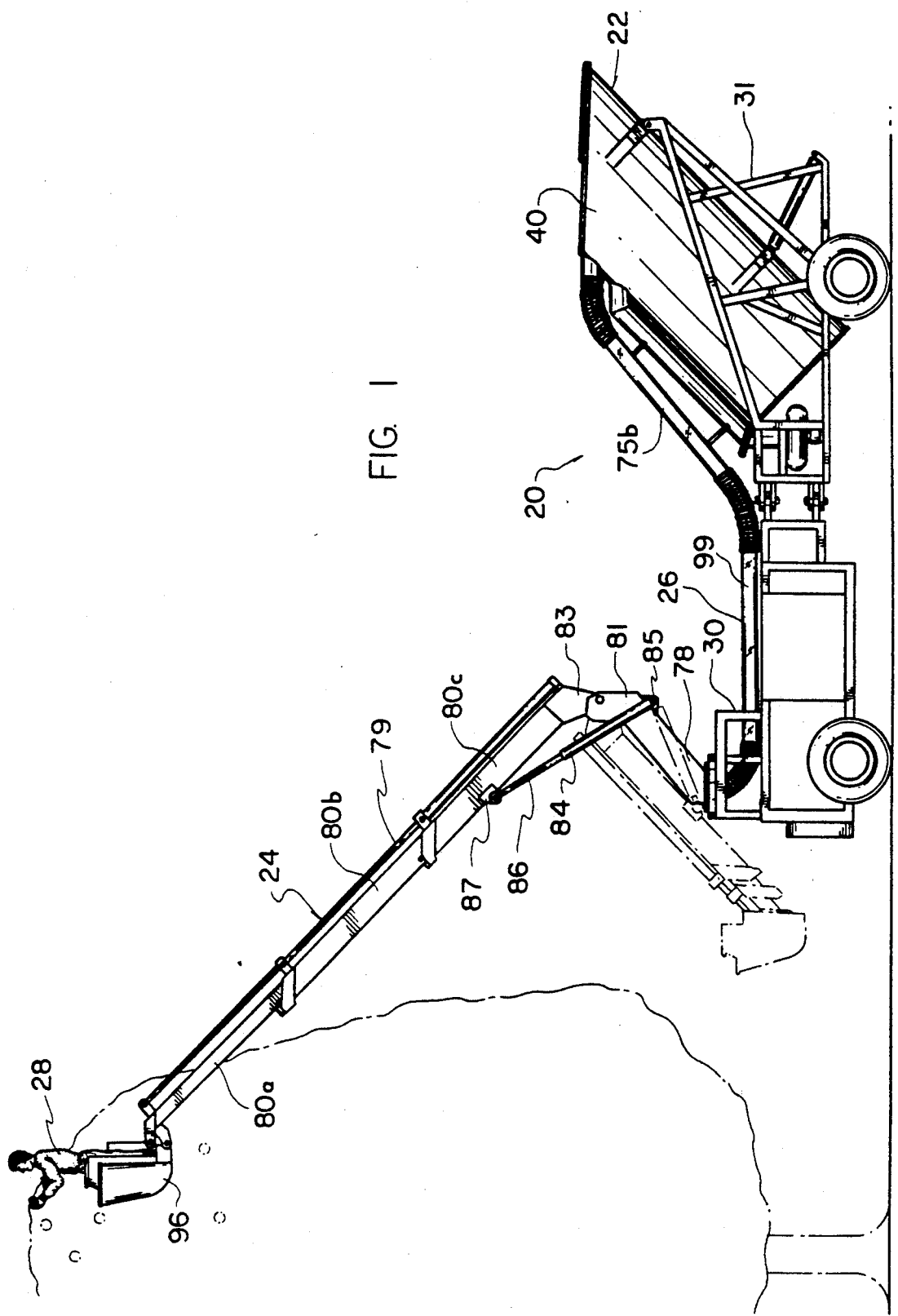

FRUIT HARVESTING MACHINE

RELATED APPLICATIONS

This application is a continuation-in-part of parent application Ser. No. 07/550,811 to McKenna, et al. which was filed on Jul. 10, 1990, now U.S. Pat. No. 5,007,772 and which is entitled FRUIT HARVESTING MACHINE. This parent application was a continuation of application Ser. No. 07/261,337 to McKenna et al. which was filed on Oct. 24, 1988 and subsequently abandoned in view of the parent application and which was also entitled FRUIT HARVESTING MACHINE. The entire disclosures of these earlier applications are hereby incorporated by reference.

FIELD OF THE INVENTION

This invention relates generally as indicated to a fruit harvesting machine and, more particularly, to a fruit harvesting machine which has an extendable/retractable boom rotatably mounted on a support vehicle.

BACKGROUND OF THE INVENTION

The agricultural industry, and in particular the citrus juice concentrate industry, depend heavily on the harvesting of fruits from trees which are grown in commercial orchards. In the past, this harvesting was primarily accomplished by a "ladder/sack" harvesting system. In such a harvesting system, a ladder is strategically positioned, or supported against, a tree so that the upper end of the ladder is located adjacent a fruit-bearing portion of the tree. A worker carrying a sack then climbs up the ladder, picks the appropriately ripened fruit within a reachable area surrounding the upper end of the ladder, and places the picked fruit into his carrying sack. When all the fruit within the reachable area has been collected, the worker climbs down from the ladder and empties the fruit in his sack into a pallet tub. The ladder is then repositioned so that its upper end is located adjacent another fruit-bearing portion of the same or a different tree and the process is repeated.

In recent years, the scarcity and/or increased cost of labor has spawned a variety of mechanical harvesting systems designed to efficiently use the efforts of workers hand-picking the fruit. One such machine is disclosed in the above-identified parent application. This machine includes a supporting vehicle, a hopper mounted on the vehicle, an extendable/retractable boom rotatably mounted on the vehicle, and a worker-supporting bucket attached to the distal, or outer, end of the boom.

In operation, the vehicle would be driven to the appropriate section of the orchard and a worker would be stationed inside the worker-supporting bucket. The boom would then be extended/retracted to a position whereat the bucket, and the worker stationed therein, would be adjacent a fruit-bearing portion of the tree. The necessary extension/retraction of the boom is accomplished primarily by an inner boom section, a middle boom section and an outer boom section, these sections being telescopically coupled to each other whereby many extension/retraction patterns are possible.

The machine further includes a conduit system which extends from the bucket, through the boom, and to the hopper. In this manner, the worker stationed inside the bucket may pick fruit from a reachable area surrounding the bucket and place such fruit in a trough connected to the outer end of the conduit system. The conduit system pneumatically conveys the fruit from the bucket to the hopper. Because a portion of the conduit system, namely the upper conduit arm, extends through the extendable/retractable boom, this upper conduit arm must also be capable of extending and retracting. As such the upper conduit arm is comprised of an inner conduit section, a middle conduit section and an outer conduit section, and these conduit sections are telescopically coupled to each other.

Perhaps at this point it should be noted that the term "inner" in this context corresponds to the boom/conduit section positioned closest to the vehicle; the term "outer" corresponds to the boom/conduit section positioned closest to the bucket; and the term "middle" corresponds to the boom/conduit section positioned therebetween. Additionally, the boom sections and the conduit sections, respectively, increase in transverse size from the outer section to the inner section. As such, the inner boom/conduit section has the largest transverse size and the outer boom/conduit section has the smallest transverse size.

Of particular concern in the present application is the coupling of the conduit sections to each other. In the machine disclosed in the parent application, the outer conduit section and the middle conduit section have a coupling therebetween which permits relative sliding movement between the outer and middle conduit sections but limits outer extension of the outer conduit section relative to the middle conduit section. The middle conduit section and the inner conduit section include a similar coupling therebetween which permits relative sliding movement between the middle conduit section and the inner conduit section but limits the outer extension of the middle conduit section relative to the inner conduit section. These couplings are of a rather bulky design because they are adapted to withstand the stresses of the extension/retraction of the upper conduit arm.

Another issue of particular concern in the present application is the support of the upper conduit arm during the extension/retraction of the boom. The conduit sections which form the upper conduit arm are typically made of a thin plastic material, and such a design advantageously minimizes the weight of the boom/conduit assembly. However, such a design also disadvantageously results in the conduits having very little bending strength whereby an significant deflection of the conduit sections may have a damaging effect. Moreover, significant deflection of the conduit sections may result in misalignment between the conduit sections which will impede the efficient travel of the fruit therethrough.

In the machine disclosed in the parent application, the outer end of the outer conduit section is fixedly mounted to the outer end of the outer boom section. Additionally, the inner end of the inner conduit section is fixedly mounted to the inner end of the inner boom section. Thus the upper conduit arm will always be supported at its inner and outer end, regardless of the extension/retraction pattern of the boom.

The machine additionally includes a first deflection-preventing member which is mounted on the inner end of the middle boom section and which is sized to cradle the inner conduit section. This first deflection-preventing member will slidably support the inner conduit section and the point of this support will depend on the particular extension/retraction pattern of the boom. For example, if the middle boom section is fully retracted relative to the inner boom section, the first deflection-preventing member will cradle and slidably support, the inner end of the inner conduit section. Alternatively, if the middle boom section is fully extended relative to the inner boom section, the first deflection-preventing member will cradle, and slidably support, the outer end of the inner conduit section.

The machine further includes a plug-groove assembly for supporting the outer end of the middle conduit section. This plug-groove assembly comprises a pair of plugs which extend radially outwardly form the outer end of the middle conduit section. A mating groove is provided for each plug in the outer boom section whereby as the middle conduit section moves relative to the outer boom section, the plugs will be positioned at different locations on the grooves. For example, when the middle conduit section is retracted and the outer boom section is extended, the plugs will be positioned at the inner ends of the grooves. Alternatively, when both the middle conduit section and the outer boom section are fully retracted, the plugs will be positioned at the outer ends of the grooves.

While the support arrangement of the machine disclosed in the parent application performs reasonably well in most extension/retraction patterns, certain complications are now contemplated when the machine is in a particular extension pattern. This particular extension pattern occurs when:

(i.) the middle boom section is fully retracted relative to the inner boom section;
(ii.) the outer boom section is fully extended relative to the middle boom section;
(iii.) the middle conduit section is fully extended relative to the inner conduit section; and
(iv.) the outer conduit section is fully retracted relative to the middle conduit section, but fully extended relative to the inner conduit section.

In such an extension/retraction pattern, the upper conduit arm is supported at only two points: its outer end and its inner end. Specifically, as in all extension/retraction patterns, the inner conduit section is fixedly secured to, and thus supported by, the inner end of the inner boom section and the outer conduit section is fixedly secured to, and thus supported by, the outer end of the outer boom section. While the machine also includes the first deflection-preventing member and the plug-groove assembly, in this particular extension/retraction pattern these components also support the upper conduit arm at its outer end and at its inner end. More specifically, in this extension/retraction pattern, the plugs will be positioned at the outer ends of the grooves. Additionally, because the middle boom section is retracted relative to the inner boom section, the first deflection-preventing member will cradle, and slidably support, the inner end of the inner boom section. Consequently, this extension/retraction portion leaves the central portion of the upper conduit without support thereby increasing the probability of premature failure. This problem is believed to be aggravated by the weight of the bulky coupling between the inner conduit section and the outer conduit section.

One solution which was considered by applicant to eliminate this complication was the addition of a second deflection-preventing member to support the middle portion of the upper conduit arm when the above-described extension pattern is encountered. Applicant contemplated designing the second deflection-preventing member so that it would be similar to the first deflection-preventing member which is mounted on the inner end of the middle boom section. In such a similar design, the second deflection-preventing member would be adapted to be mounted on the inner end of the outer boom section and would be designed to support cradle the middle conduit section. In this manner, the second deflection-preventing member could support the central portion of the upper conduit arm in the above-described and other extension/retraction patterns.

However, modifying the machine to include a second deflection-preventing member of this design proved to be unworkable in actual practice for several reasons, most of which relate to the inability of the boom to telescope in the intended manner. For example, if the second deflection-preventing member were sized to cradle the middle conduit section, this would prevent the middle boom section from being retracted relative to, or telescoped within, the inner boom section. This prevention is due to the fact that the second deflection-preventing member would be unable to travel past the bulky coupling between the inner conduit section and the middle conduit section. Moreover, even if the second deflection-preventing member could travel past this bulky coupling, a rigid member would not be able to make the transition between the middle conduit section to the inner conduit section (which has the largest cross-sectional size of the three conduits) during the retraction process.

Applicant therefore believes a need remains for a harvesting machine which provides adequate support for the upper conduit arm in virtually all extension patterns

SUMMARY OF THE INVENTION

The present invention provides a machine for harvesting fruit from trees which is believed to provide adequate support for the upper conduit arm in essentially all extension/retraction patterns. In particular, the present invention provides support for the central portion of the upper conduit arm when the boom is positioned in the following extension/retraction pattern:

(i.) the middle boom section is fully retracted relative to the inner boom section;
(ii.) the outer boom section is fully extended relative to the middle boom
(iii.) the middle conduit section is fully extended relative to the inner conduit section; and
(iv.) the outer conduit section is fully retracted relative to the middle conduit section, but fully extended relative to the inner conduit section.

In such an extension/retraction pattern, the upper conduit arm will be supported at three points: its outer end; its inner end; and a central portion therebetween. More particularly, the inner conduit section will be supported at its inner end; the outer conduit section will be supported at its outer end; and the outer end of the inner conduit section and/or the inner end of the middle conduit section will be supported by a second deflection-preventing member mounted on the inner end of the middle boom section. Thus the second deflection-preventing member will play a key role in supporting the central portion of the upper conduit arm.

When the machine disclosed in the parent application is modified according to the present invention, the required support is provided without interfering with the ability of the boom to telescope in the intended manner. To this end, the second deflection-preventing member is designed so that it will accommodate both the inner conduit section and the middle conduit section at various extension/retraction patterns. Additionally, the bulky coupling between the inner conduit section and the middle conduit section is replaced by inwardly extending shoulders which allow the second deflection-preventing member to travel relatively smoothly thereover.

More particularly, the present invention provides a machine for harvesting fruit from trees. The machine includes a support vehicle, a hopper mounted on the vehicle, a blower assembly for maintaining a sub-atmospheric pressure in the hopper, an extendable/retractable boom rotatably mounted on the vehicle, a worker-supporting bucket attached to the outer end of the boom, and a conduit system extending from the bucket, through the boom, and into the hopper whereby fruit is pneumatically converged from the bucket to the hopper. The boom includes inner, middle and outer telescopically slidable boom sections and the conduit system includes inner, middle and outer telescopically slidable conduit sections. The outer end of the outer conduit section is fixedly mounted to the outer end of the outer boom section and the inner end of the inner conduit is fixedly mounted to the inner end of the inner boom section. The boom sections and conduit sections respectively increase in size from the outer section to the inner section. The machine further comprises a first deflection-preventing member which is mounted on the inner end of the middle boom section; and a second deflection-preventing member which is mounted on the inner end of the outer boom section.

According to one embodiment of the present invention, the second deflection-preventing member comprises a plate-shape main body portion. The plate-shape main body portion has an arcuate edge sized to form a cradle for the middle conduit section and an opposite edge which is pivotally attached to the inner end of the outer boom section. In this embodiment, the second deflection-preventing member is preferably biased to a normal transverse position.

According to another embodiment of the present invention, the second deflection-preventing member comprises a spool-shaped elastomeric body supported on a shaft which is attached to the inner end of the outer boom section. The spool-shaped body includes an arcuate edge which is sized, when in an undeformed state, to form a cradle for the middle conduit section. Additionally, the spool-shaped body possesses elastomeric properties such that it will allow the deformation necessary to accommodate the inner conduit section.

According to yet another embodiment of the present invention, the second deflection-preventing member comprises a plate-shape main body portion having an arcuate edge sized to form a cradle for the outer conduit section. In this embodiment, the deflection-preventing member would not absolutely support the middle conduit as in the above-described embodiments. Instead, this deflection-preventing member would allow only a limited deflection if the middle conduit section equal to half the difference between the diameters of the inner conduit section and the outer conduit section.

Thus the present invention provides a machine for harvesting fruit from trees which is believed to provide adequate support for the upper conduit arm in essentially all extension/retraction patterns and the required support is provided without interfering with the ability of the boom to telescope in the intended manner.

These and other features of the invention are fully described and particularly pointed out in the claims. The following descriptive annexed drawings set forth in detail certain illustrative embodiments of the invention, however, these embodiments are indicative of but a few of the various ways in which the principles of the invention may be employed.

BRIEF DESCRIPTION OF THE DRAWINGS

In the annexed drawings:

FIG. 1 is a side elevation of a fruit harvesting machine as was disclosed in the parent application, the machine including an extendable/retractable boom which is shown in an extended condition in full lines and in a retracted condition in phantom lines;

Applicant notes that FIGS. 1-16 were included in the parent application; and FIGS. 17-23 have been added to aid in the explanation of the present invention.

DETAILED DESCRIPTION

Figure 2A:
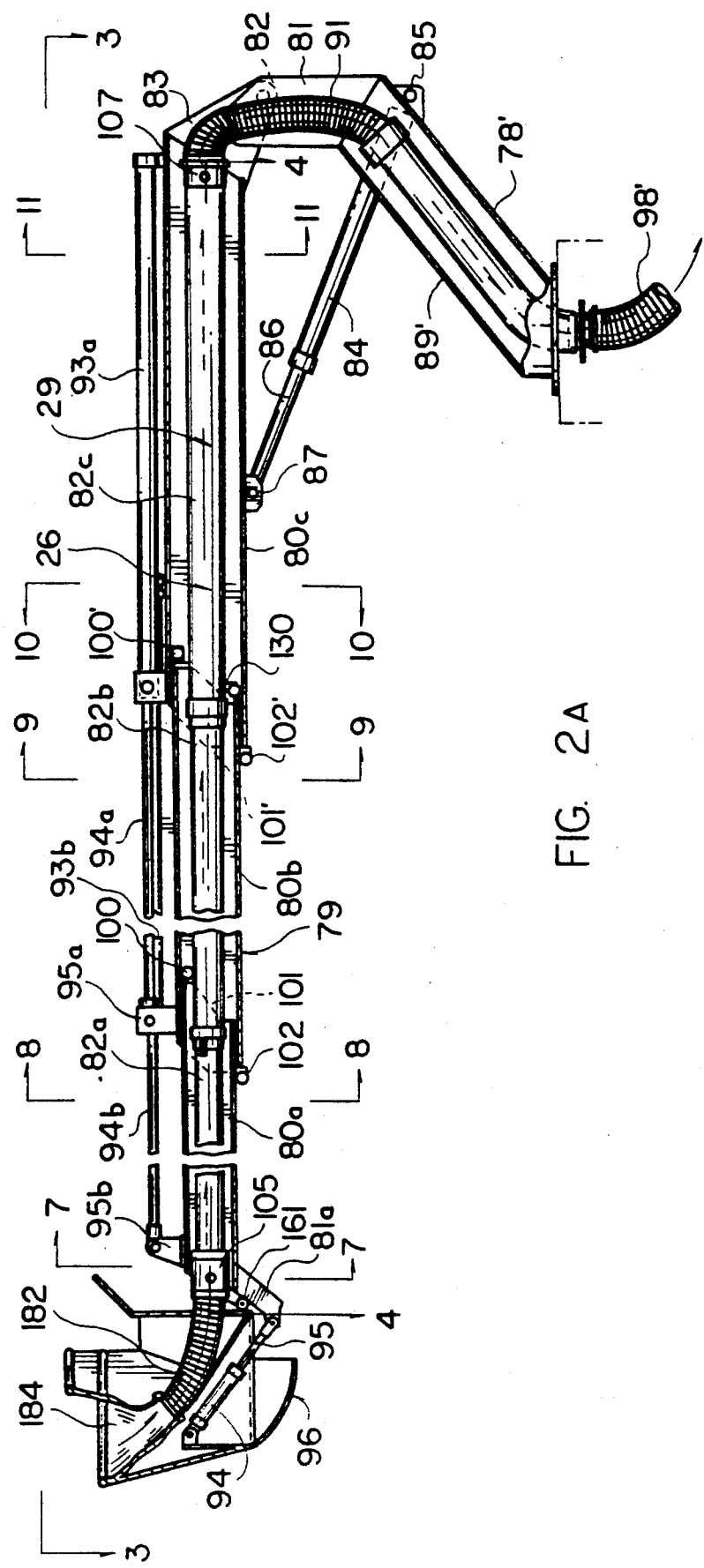
FIG. 2A is an enlarged cross section, partly broken away, of certain components of the machine, namely the boom (which is shown in an extended condition), a worker-supporting bucket and a conduit system.

Referring now to the drawings in detail, and initially to FIG. 1, a harvesting machine, indicated generally at 20, is shown. The machine 20 is disclosed in the parent application and an appreciation of its components and operation is helpful in understanding the present invention. As is explained in more detail below, when the machine 20 is modified according to the present invention, it provides support for the necessary components in essentially all extension/retraction patterns and the required support is provided without interfering with the ability of the machine 20 to extend and retract in the necessary manner.

Examining initially the machine 20 without the modifications according to the present invention, it includes a support vehicle 22, a hopper 40 which is mounted on the vehicle 22, an extendable/ retractable boom 24 is rotatably mounted on the vehicle 22, and a worker-supporting bucket 96 which is attached to the distal, or outer, end of the boom 24. The machine 20 further includes a conduit system 26 which extends from the bucket 96, through the boom 24, and to the hopper 40. An exhaust blower assembly 66 is provided for maintaining a sub-atmospheric pressure within the hopper 40 whereby fruit may be transferred through conduit system 26 and into the hopper 40.

In operation, the vehicle 22 would be driven to the appropriate section of the orchard and a worker 28 would be stationed inside the man-supporting bucket 96. The boom 24 would then be extended to position the bucket 96, and the worker 28 stationed therein, adjacent a fruit bearing portion of the tree. In this manner, the worker 28 may pick the appropriately ripened fruit from a reachable area surrounding the bucket 96 and place such fruit in the conduit system 26 whereby the fruit will be transferred from the bucket 96 to the hopper 40.

Figure 13:
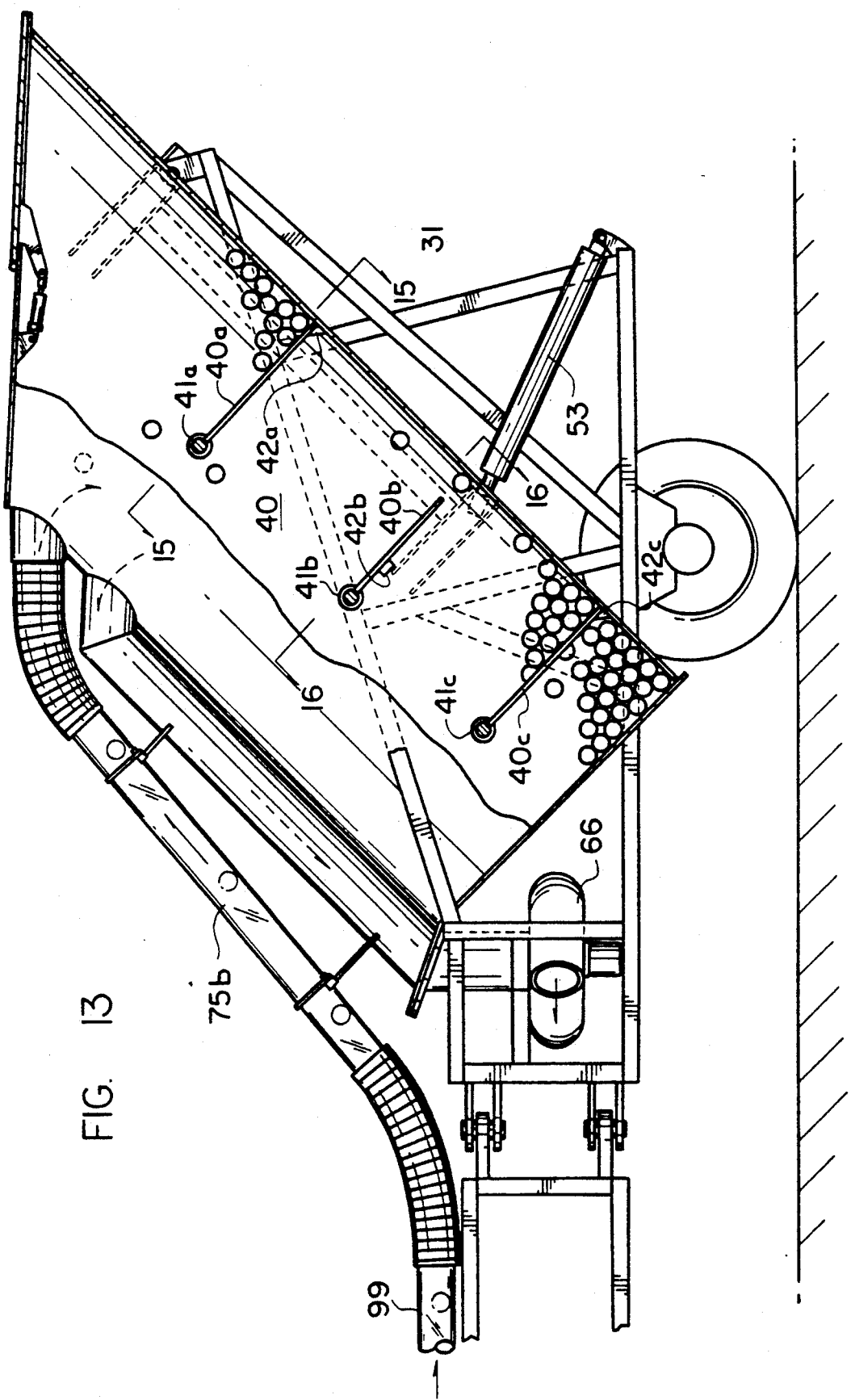
FIG. 13 is an enlarged side elevation view, partly in section, of the machine's hopper and baffle system, these components being shown in a fruit-receiving position.

The support vehicle 22 includes a front section 30 and a rear section 31. A portion on the extendable/retractable boom 24, namely an angularly disposed bottom boom arm 78, is rotatably mounted on the front section 31, while the hopper 40 is supported on the rear section 31. A detailed description of the rotatable mounting of the bottom boom arm 78 on the vehicle 22, and of the steering mechanism between the front and rear vehicle sections 30 and 31, is described in detail in U.S. Pat. No. 3,878,957, the entire disclosure of which is hereby incorporated by reference. This patent also describes in detail the supporting frame of the hopper 40 and its "tilting" components such as the hydraulic cylinder 53. (See FIGS. 13 and 14)

Figure 14:
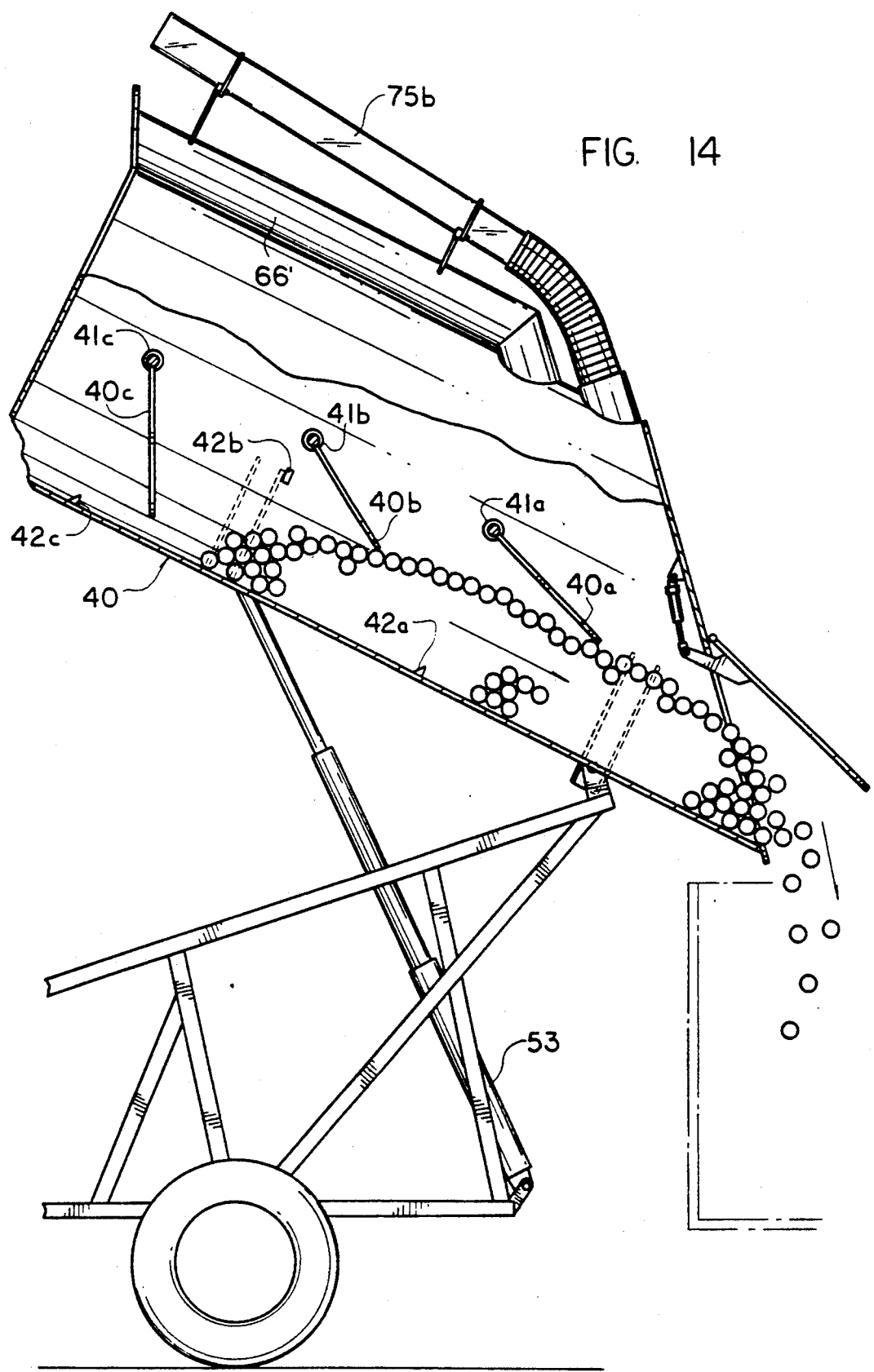
FIG. 14 is a view similar to FIG. 13 except that it shows the hopper and baffle system in a fruit-dumping position.
Figure 15:
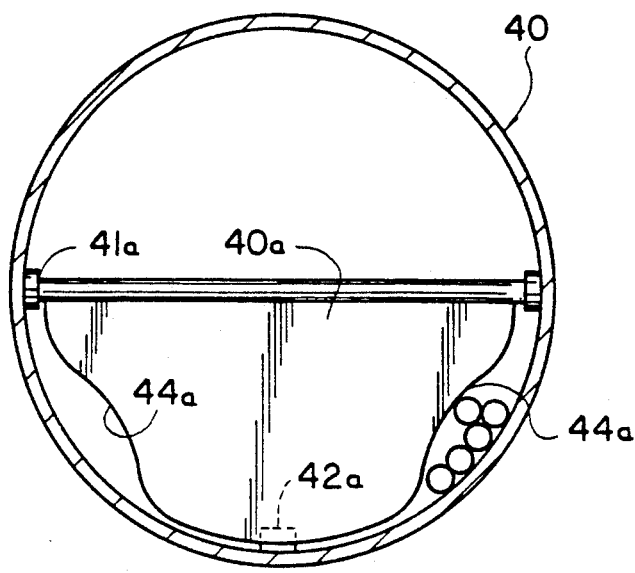
FIG. 15 is a partial cross section of the hopper taken on line 15—15 of FIG. 13.
Figure 16:
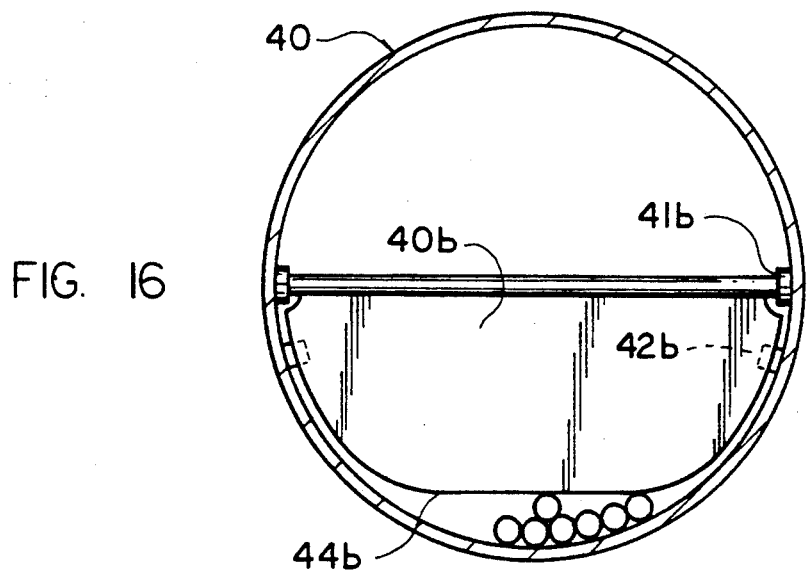
FIG. 16 is a partial cross section of the hopper taken on line 16—16 of FIG. 13.

The hopper 40 includes a baffle system comprising three baffle plates 40A, 40B, and 40C which are pivotally attached to the hopper 40 at 41A, 41B and 41C. Stops 42A, 42B and 42C are provided to position the baffle plates transversely of the hopper 40 when it is in the fruit-receiving position shown in FIG. 13. In this manner, the fruit will be supported in three sections in the hopper 40 thereby distributing the weight of the fruit and inhibiting the crushing of the fruit. It may be additionally noted that the baffle plates 40A, 40B, and 40C are provided with contoured edges 44A, 44B, and 44C, respectively, whereby fruit cannot drop unrestrained past all three baffle plates when the hopper 40 is in the fruit-receiving position. (See FIGS. 15 and 16) However, when the hopper 40 is placed in the fruit-dumping position as shown in FIG. 14, the baffle plates 40A, 40B, and 40C are free to swing away from the stops 42A, 42B and 42C, respectively, as shown in FIG. 14, to allow the unrestrained unloading of the fruit.

As was indicated above, the extendable/retractable boom 24 includes an angularly disposed bottom boom arm 78. The boom 24 also includes an upper boom arm 79 which is pivotally attached to the bottom boom arm 78. More specifically, side-wings 83 of the upper boom arm 78 are pivotally attached at 82 to flange portions 81 of the bottom boom arm 78. Hydraulic cylinders 84 are provided for raising and lowering the upper boom arm 79 and each cylinder 84 is pivotally attached at 85 to the bottom boom arm 78 and its piston rod 86 is pivotally attached to brackets 87 on the upper boom arm 79.

To accomplish the necessary extension/retraction, the upper boom arm 79 is comprised of three boom sections, namely an inner boom section 80C, a middle boom section 80B, and an outer boom section 80A, which are telescopically coupled to each other whereby many extension/retraction patterns are possible. The term "inner" in this context corresponds to the boom section positioned closest to the vehicle 22; the term "outer" corresponds to the boom section positioned closest to the bucket 96; and the term "middle" corresponds to the boom section positioned therebetween. The boom sections 80A, 80B and 80C are rectangular in transverse cross section and increase in transverse size from outside to inside whereby the inner boom section 80C is the largest in transverse size and the outer boom section 80A is the smallest in transverse size.

Figure 3:
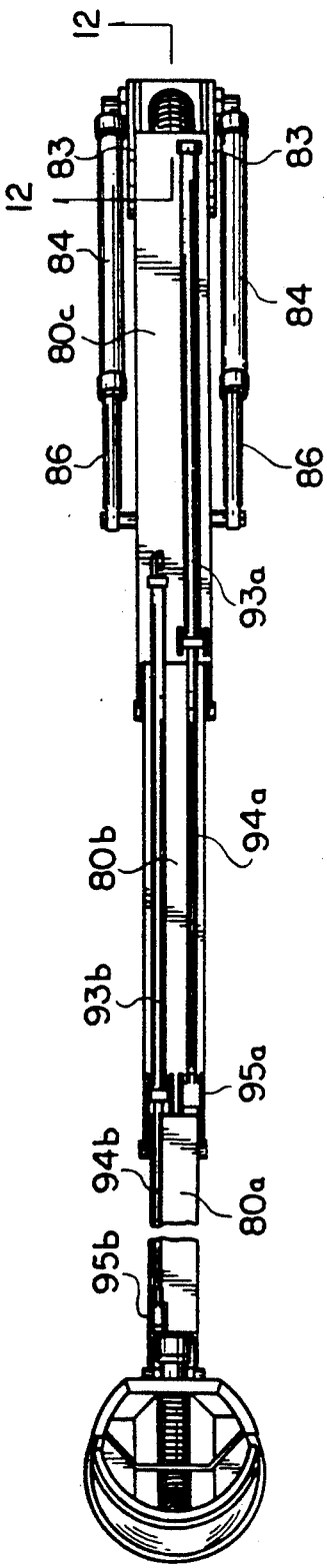
FIG. 3 is a plan elevational view of the boom and the worker-supporting bucket of the machine, taken along line 3—3 in FIG. 2A.
Figure 5:
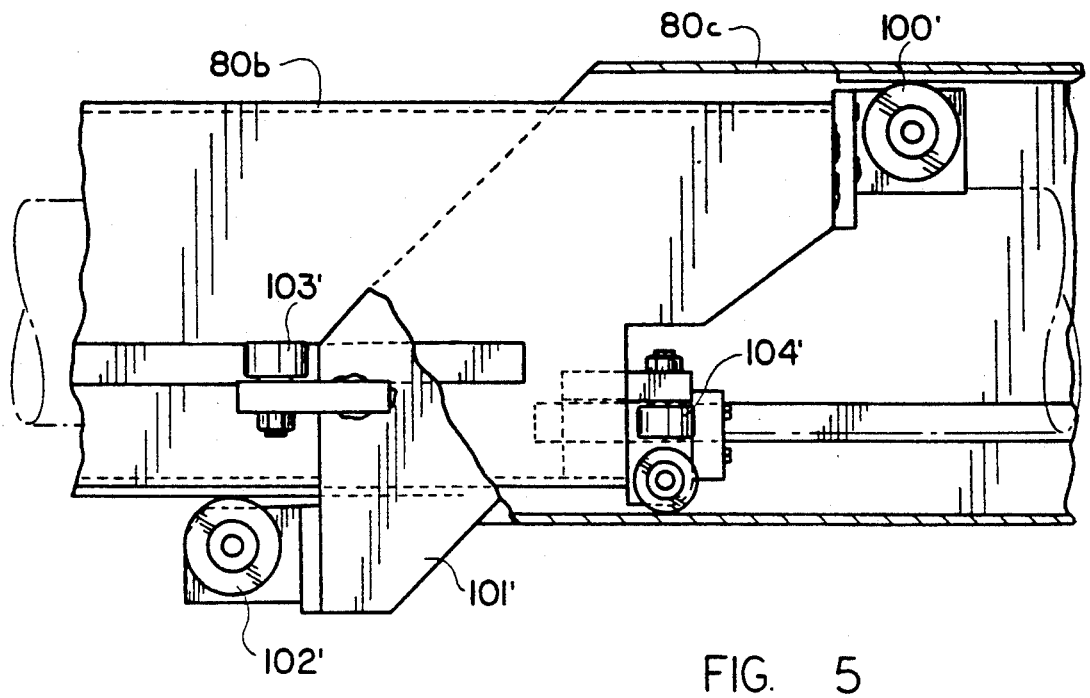
FIG. 5 is an enlarged side view, partly in section and partly in elevation, showing an extension/retraction pattern of the boom in which the inner end of the middle boom section is telescoped within the outer end of the inner boom section.
Figure 6:
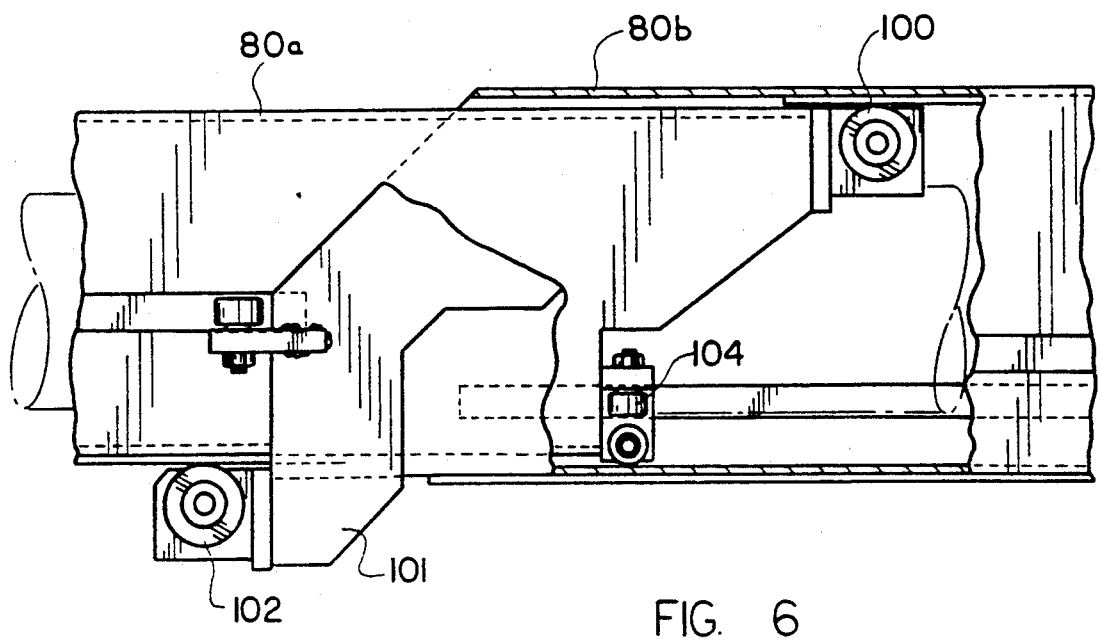
FIG. 6 is a view similar to that of FIG. 5 showing another extension/retraction pattern of the boom in which the inner end of the outer boom section is telescoped within the outer end of the middle boom section.
Figure 7:
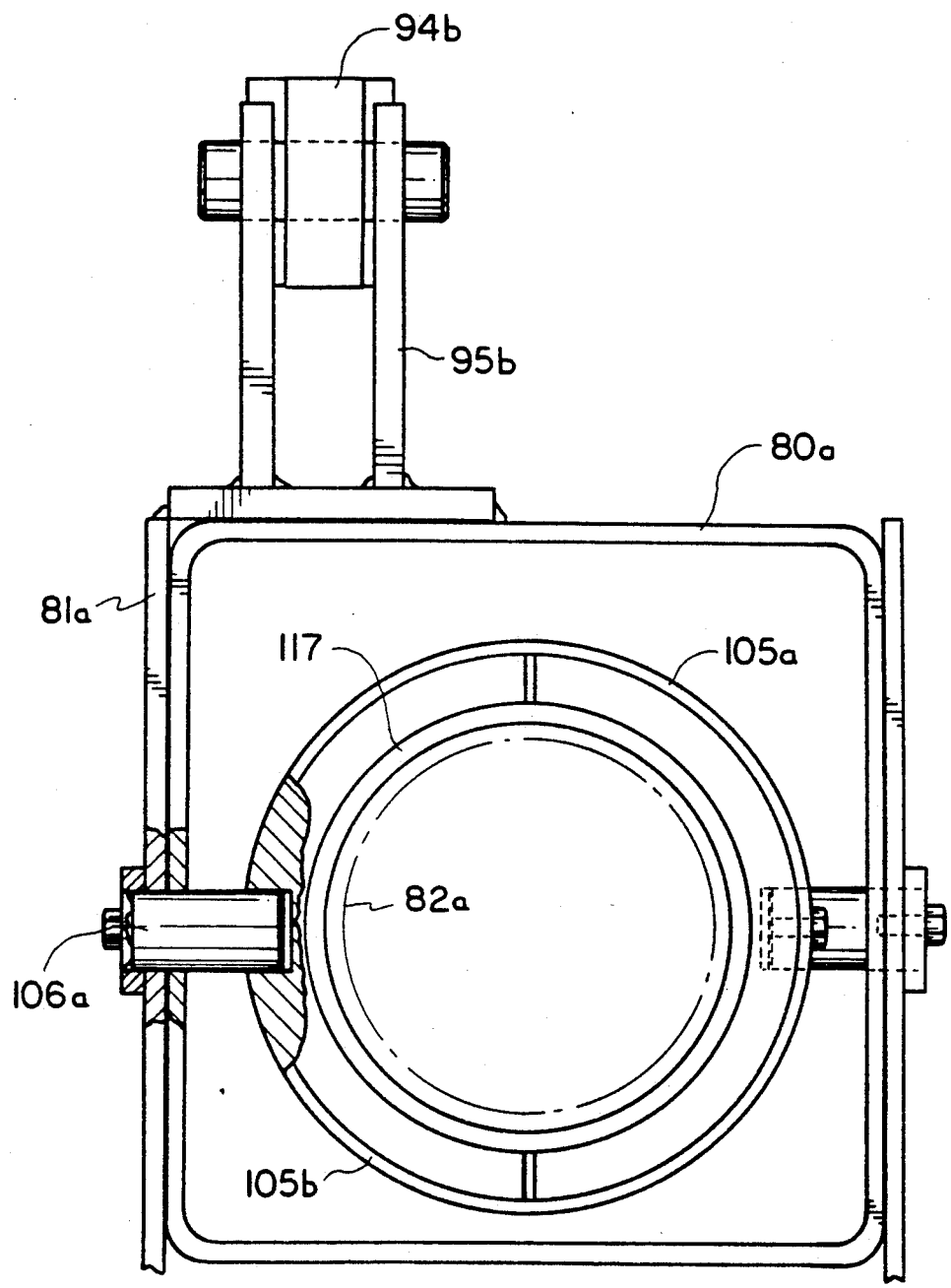
FIG. 7 is an enlarged cross sectional view taken on line 7—7 of FIG. 2.
Figure 8:
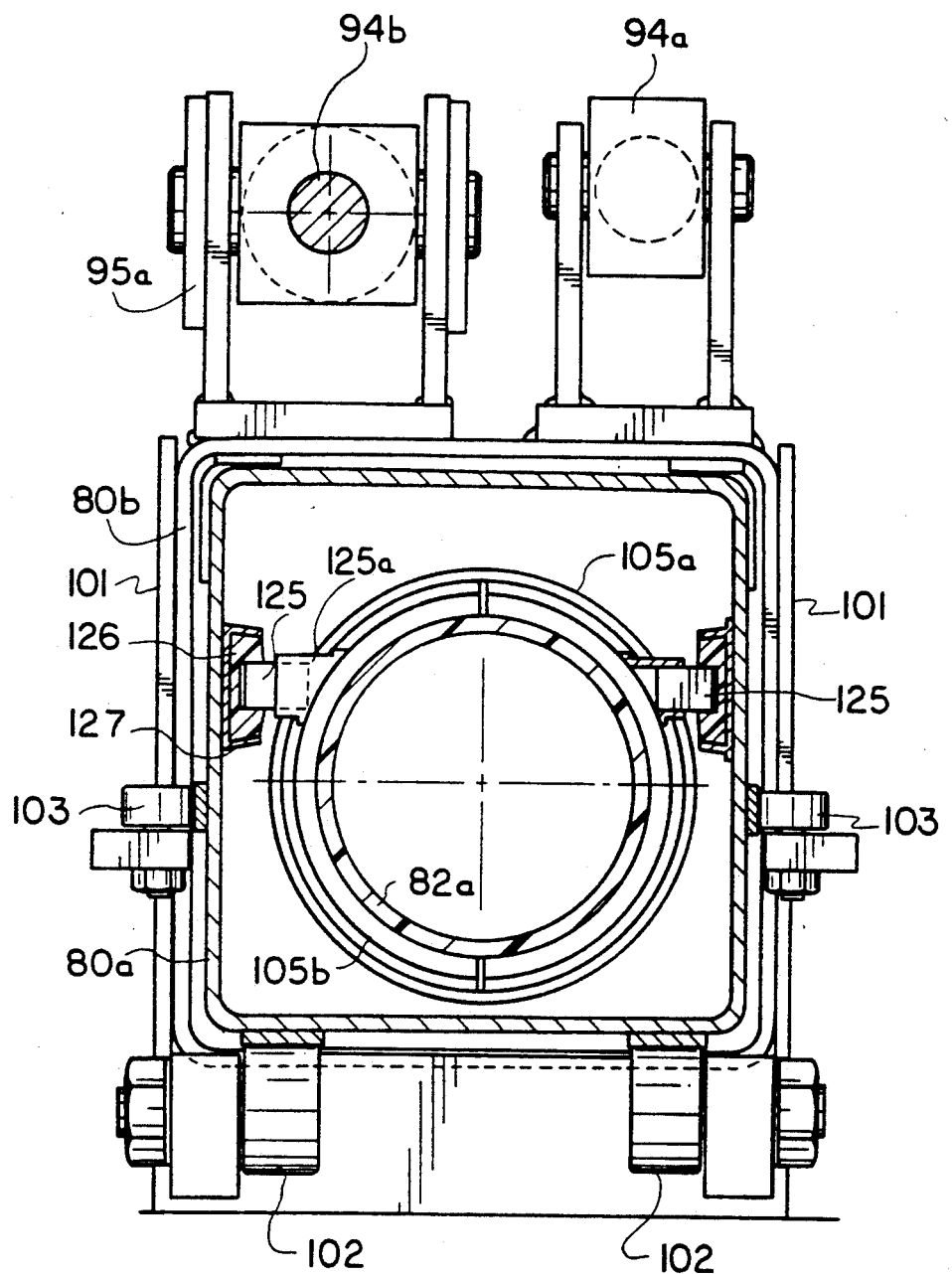
FIG. 8 is an enlarged cross sectional view taken on line 8—8 of FIG. 2.
Figure 9:
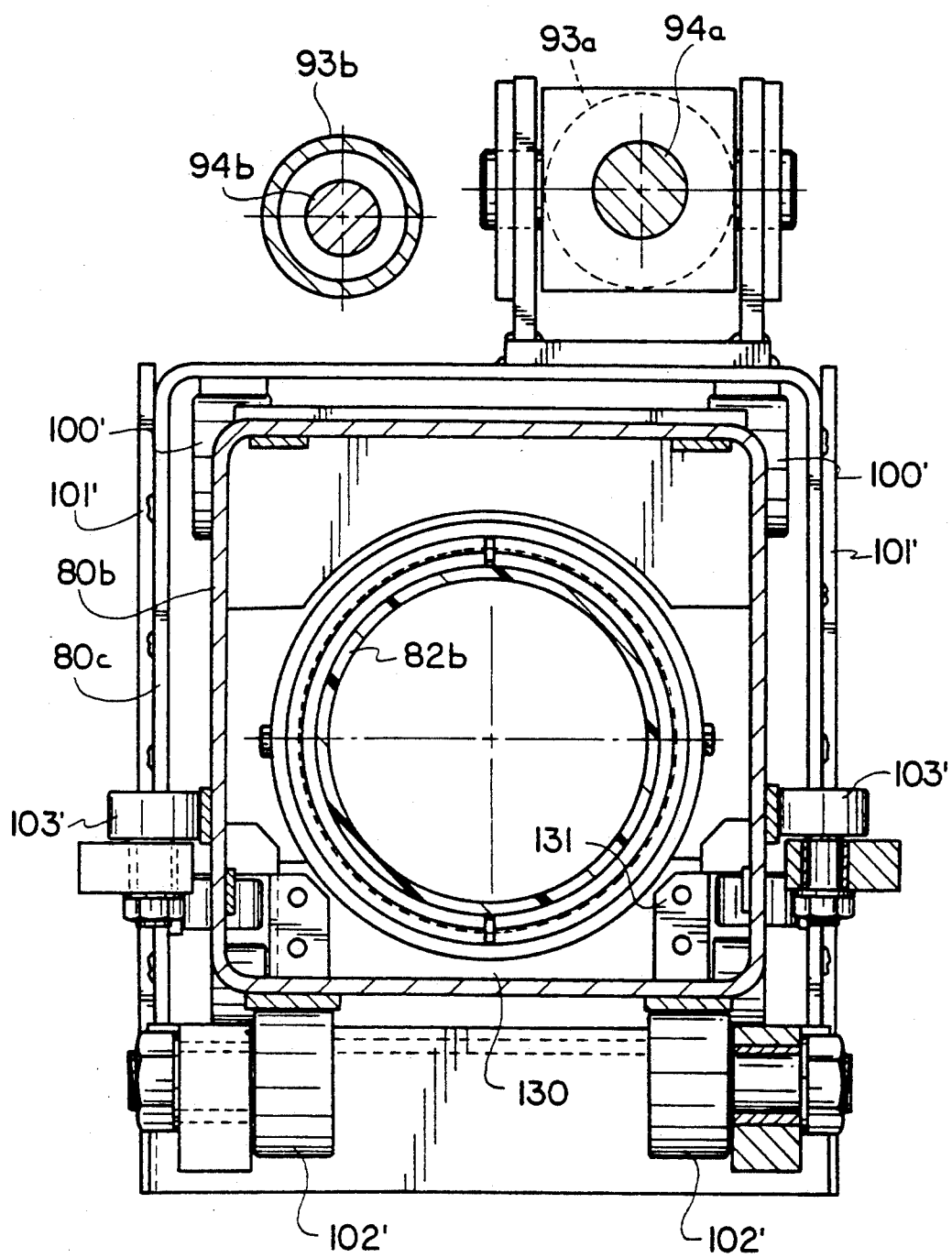
FIG. 9 is an enlarged cross sectional view taken on line 9—9 of FIG. 2.
Figure 10:
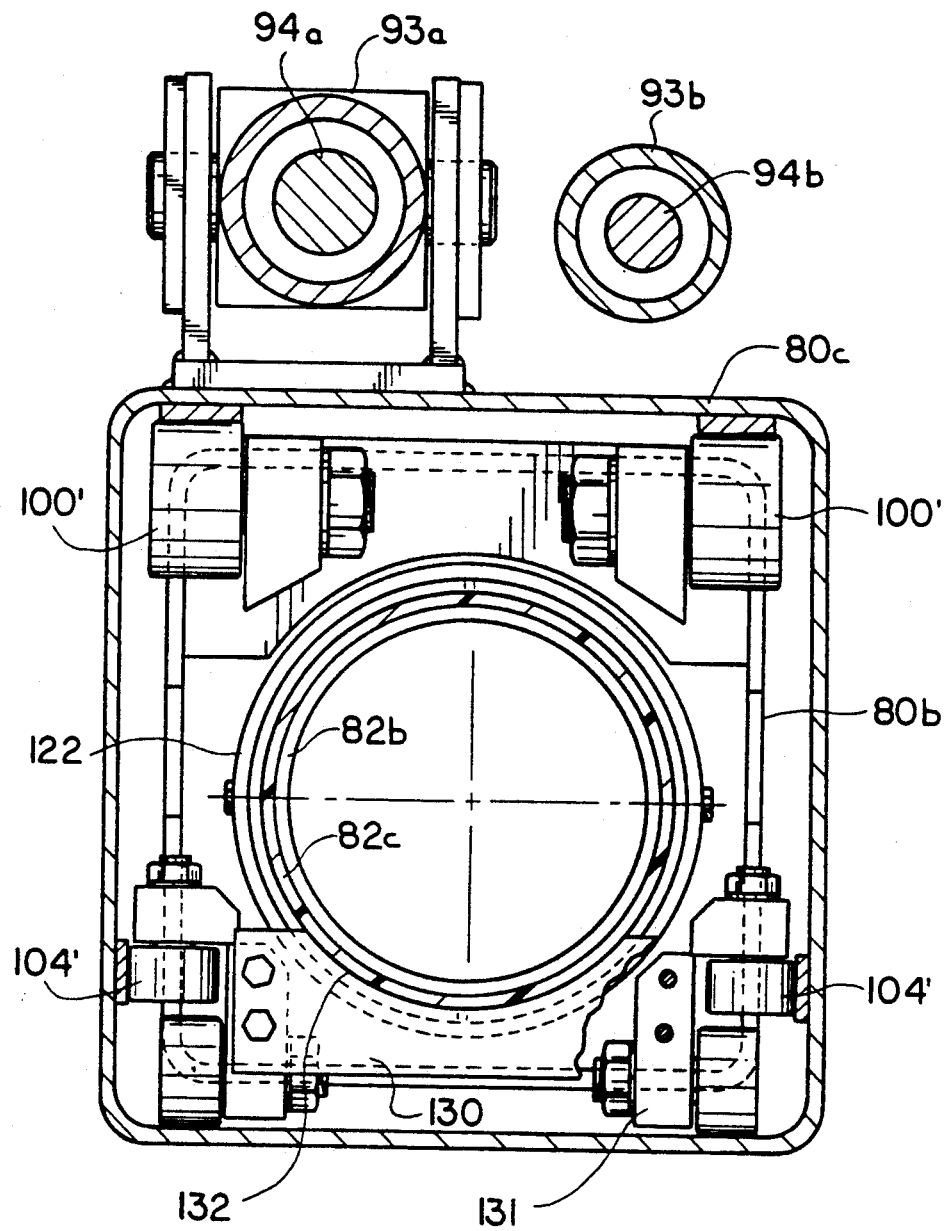
FIG. 10 is an enlarged cross sectional view taken on line 10—10 of FIG. 2.

The telescopic movement of the boom sections relative to each other is accomplished by hydraulic cylinders 93A and 93B. As is best seen in FIG. 3, the hydraulic cylinder 93A is mounted on the inner boom section 80C and has its piston rod 94A connected to a bracket 95A on the middle boom section 80B whereby the movement of the piston rod 94A corresponds to the extension/retraction of the middle boom section 80B within the inner boom section 80C. The hydraulic cylinder 93B is mounted on the middle boom section 80B and has its piston rod 94B connected to a bracket 95B on the outer boom section 80A whereby the movement of the piston rod 94B corresponds to the extension/retraction of the outer boom section 80A within the middle boom section 80B.

To accommodate the necessary telescopic sliding movement between the boom sections, they are supported one on another by rollers. More particularly, the outer boom section 80A has rollers 100 which coordinate with side plates 101, and rollers 102 and 103. Similarly, the middle boom section 80B has rollers 100' which coordinate with side plates 101' and rollers 102' and 103'. Additionally, side rollers 104 and 104' may be mounted on the ends of sections 80A and 80B. (See FIGS. 2A, 5, 6 and 8-10)

Figure 2B:
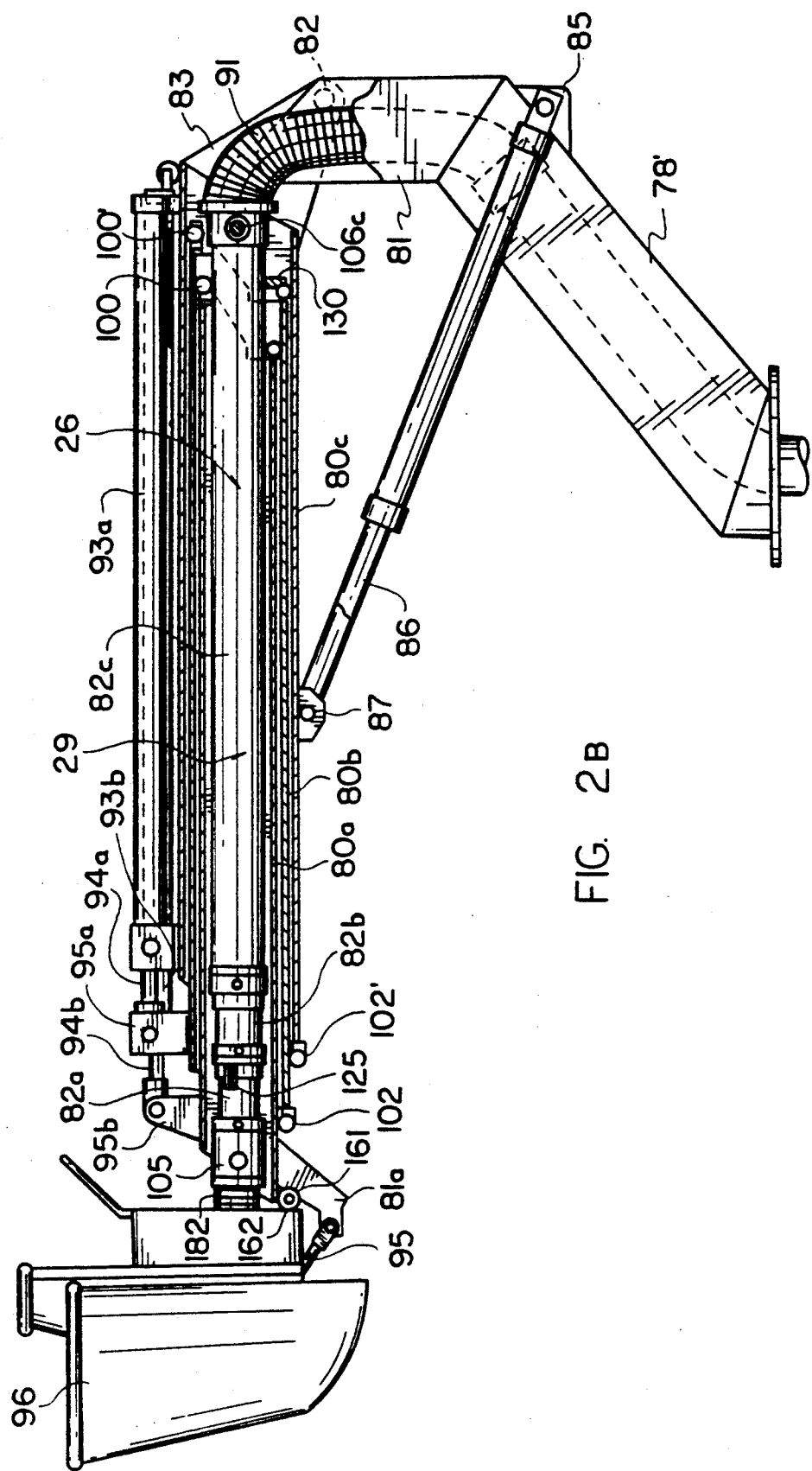
FIG. 2B is a view similar to that of FIG. 2A except showing the boom in a retracted condition.

The worker-supporting bucket 96 is pivotally mounted to the distal, or outer, end of the outer boom section 80A by a set of rollers 161 mounted on the bucket-mounting pivot shaft 162. A hydraulic leveling cylinder 94 is provided for maintaining the level of the bucket 96 regardless of the inclination of the upper boom arm 79. The cylinder 94 is pivotally mounted on the bucket 96 and its piston rod 95 is attached to side plates 81A which extend angularly downward from the outer boom section 80A. (See FIGS. 2A and 2B)

Turning now to the conduit system 26, it extends from the worker-supporting bucket 96, through the boom 24, and into the hopper 40. As such, the conduit system 26 may be viewed as being comprised of a bucket-coupling conduit section 182, an upper conduit arm 29, and boom-hopper connecting conduit sections 91, 89', 98, 99 and 75B. The bucket-coupling conduit section 182 extends from the bucket 96 to the upper conduit arm 29; the upper conduit arm 29 extends through the upper boom arm 79, and the boomhopper connecting sections extend from the upper conduit arm 79 to the hopper 40.

Because the upper conduit arm 29 extends through the extendable/retractable portion of the boom 24, namely the upper boom arm 79, the conduit arm 29 must also be capable of extending and retracting. As such the upper conduit arm 29 is comprised of three cylindrical conduit sections, namely an outer conduit section 82A, a middle conduit section 82B, and an inner conduit section 82C. These conduit sections are mounted within the upper boom arm 79 in such a manner that they may telescopically slide relative to one another. (The terms "inner", "middle", and "outer" in this context follow the same convention as that set forth for the boom sections.) The conduit sections are sized and arranged so that the outer conduit section 82A is the smallest in diameter and the inner conduit section 82C is the largest in diameter.

Figure 4:
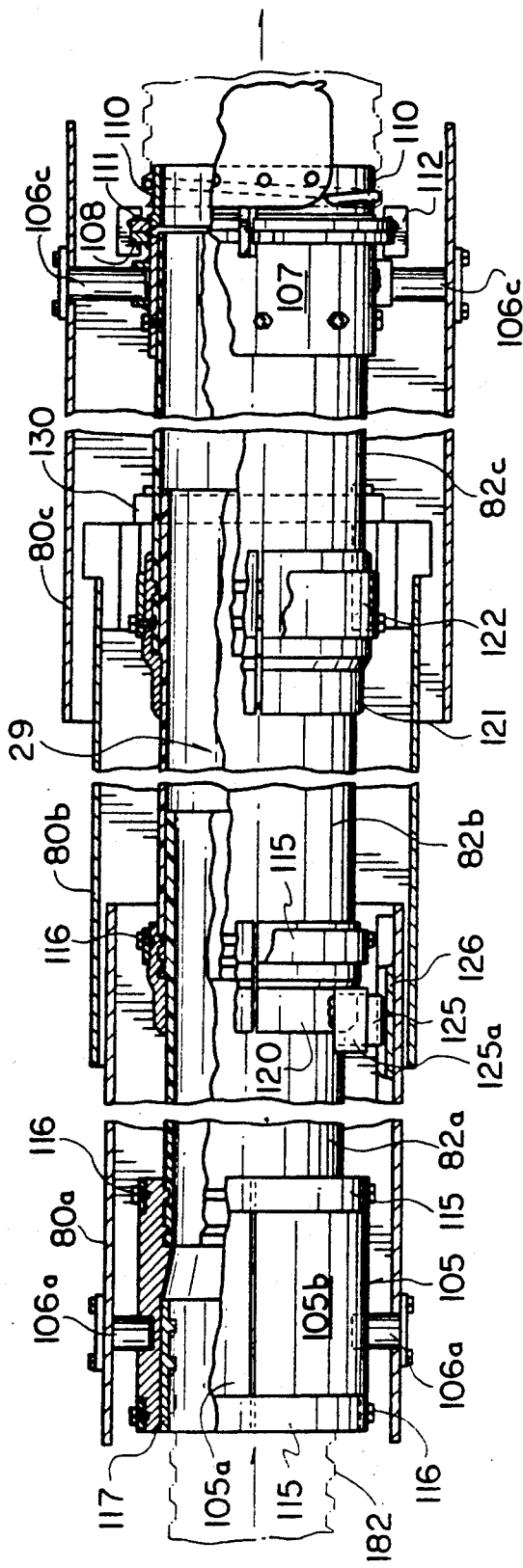
FIG. 4 is an enlarged plan sectional view taken on line 4—4 of FIG. 2A, partly broken away and with certain components omitted for the sake of clarity.

As was explained above, the outer end of the upper conduit arm 29 connects with the worker-supporting bucket 96 whereby the worker 28 may transfer fruit from the bucket to the hopper 40. To accomplish this communication, the bucket-coupling conduit section 182 extends between a trough 184 in the bucket 96 and the outer, or distal, end of the outer conduit section 82A. The bucket-coupling conduit section 182 is connected to the conduit section 82A by a coupling 105 which includes two halves 105A and 105B clamped together by circular bands 115 and screws 116. A plastic liner 117 is held in place by circumferential ribs 1118 on the coupling 105 which engage matching grooves 119 on the conduit section 82A. (See FIG. 4)

Figure 12:
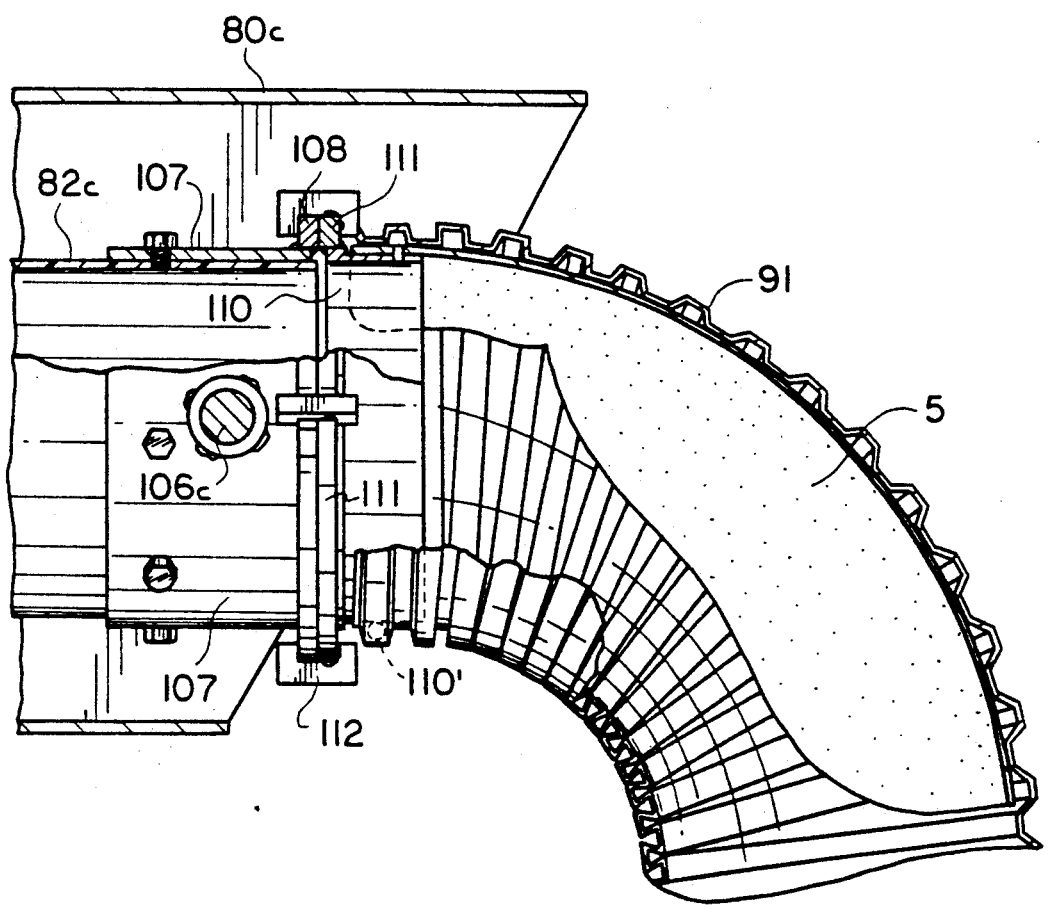
FIG. 12 is an enlarged partial sectional view showing the connection between various conduit sections of the conduit system.

While the outer end of the upper conduit arm 29 communicates with the worker-supporting bucket 96, the inner end of the upper conduit arm 29 communicates with the boom-hopper connecting conduit sections which in turn communicate with the hopper 40. More particularly, the inner end of the inner conduit section 82C is connected by a coupling 107 to the conduit section 91, which in turn is connected to the remaining boom-hopper connecting conduit sections. (See FIG. 2A) In this manner, the worker 28 stationed in the bucket 96 may pick a piece of fruit, place it in the trough 184, and the fruit will be pneumatically converged through the bucket-coupling conduit section 182, through the conduit sections 82A, 82B and 82C, through the boom-hopper conduit sections 91, 89' and 88, 99, and 75B, and into the hopper 40. A plastic shoe 5 may be positioned within the flexible tube 91 as shown in FIG. 12 to cushion the fruit as it travels through the conduit system 26.

Of particular concern in the present application is the coupling of the conduit sections 82A, 82B and 82C to each other. To this end, it is noted that the conduit sections are secured to one another by a pair of split couplings 120 and 121. More particularly, the inner end of the outer conduit section 82A is secured within the outer end of the middle conduit section 82B by the split coupling 120; and the outer end of the inner conduit 82C is secured within the inner end of the middle conduit section 82B by the split coupling 121. As is explained in more detail below, these couplings 120 and 121 are of a rather bulky design because they are adapted to withstand the stresses of the extension/retraction of the upper conduit arm 29.

The split coupling 120 includes two halves which are clamped together by a circular band 115 and screws 116. The interior of the coupling 120 has an inner ribbed portion which is sized to engage with an exterior grooved portion on the outer overlapping end of the middle conduit section 82B. In this manner, inter-engaging shoulders are formed on the coupling 120 and the inner end portion of the outer conduit section 82A, and these shoulders interact to positively limit relative outer extension movement between conduit sections 82A and 82B. The split coupling 121 is of a similar design whereby its two halves are clamped together by a circular band 122, and inter-engaging shoulders are formed to limit relative outer extension movement between conduit sections 82B and 82C.

Another issue of particular concern in the present application is the support of the upper conduit arm 29 during the various extension/retraction patterns of the boom. The conduit sections 82A, 82B and 82C which form this upper conduit arm 29 are typically made of a thin plastic material, and such a design advantageously minimizes the weight of the upper conduit arm. However, such a design also disadvantageously results in the conduit sections having very little bending strength. Consequently, any significant deflection of the conduit sections may result in misalignment between the conduit sections causing binding and wear between the conduit sections. Moreover, significant deflection of the conduit sections may also impede the efficient travel of the fruit through the upper conduit arm 29.

Addressing now the support of the upper conduit arm 29 during the various extension/retraction patterns of the boom 24, it is initially noted that the inner and outer ends of the conduit arm 29 are fixed secured to the upper boom arm 79. As such, the upper conduit arm 29 will always be supported at its inner and outer ends, regardless of the extension/retraction pattern of the boom 24. The particular support arrangement includes the outer end of the outer conduit section 82A being fixedly secured to the outer end of outer boom section 80A by studs 106A. The studs 106A are bolted to the section 80A and received in the coupling member 105, which, as was explained above, additionally serves to connect the outer conduit section 82A to one end of the bucket-coupling conduit section 182.

Figure 11:
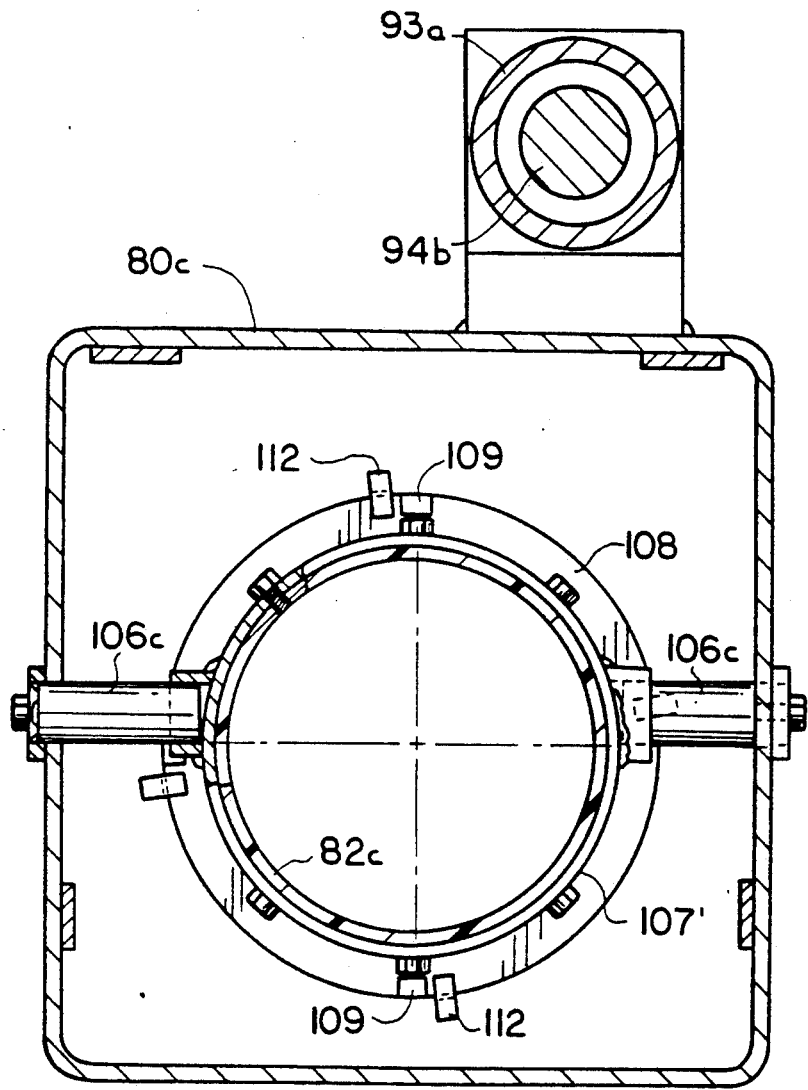
FIG. 11 is an enlarged cross sectional view taken on line 11—11 of FIG. 2.

Regarding the inner end of the upper conduit arm 79, it is noted that the inner end of the inner conduit section 82C is secured to the inner end of the boom section 80C by studs 106C which are bolted to the boom section 80C and received in a coupling member 107. The coupling member 107 includes a flange 108 which is slotted at 109. A mating coupling member 110 is provided having a flange 111 which is positioned in an abutting relationship with the flange 108 and retractable U-shaped clips 112 which are designed to slidably engage the flange 108. (See FIGS. 11 and 12)

The machine 20 additionally includes a first deflection-preventing member 130 which is mounted on the inner end of the middle boom section 80B. The deflection-preventing member 130 is bolted on brackets 131 welded to the inner end of boom section 80B and it has an arcuate upper edge 132 sized to form a cradle for the cylindrical inner conduit section 82C. (See FIGS. 4 and 10) In this manner, the first deflection-preventing member 130 will slidably support the inner conduit section 82B and the point of the slidable support will depend on the particular extension/retraction pattern of the boom 24. For example, if the middle boom section 82B is fully retracted relative to the inner boom section 82C, the first deflection-preventing member will cradle, and slidably support, the inner end of the inner boom section 82C. Alternatively, if the middle boom section 82B is fully extended relative to the inner boom section 82C, the first deflection-preventing member will cradle, and slidably support, the outer end of the inner boom section 82C.

The machine 20 further includes a plug/groove assembly for supporting the outer end of the middle conduit section 82B. (See FIGS. 4 and 8) This plug/groove assembly includes a pair of plugs 125 which are mounted in sockets 126 on the coupling 120. The plugs 125 slidably engage grooves contained in a pair of longitudinal strips 126 placed in a pair of channels 127 which are secured to opposite sides of the outer boom section 80A. As the middle conduit section 82B is extended/retracted relative to the outer boom section 80A, the plugs 125 will be positioned at different locations on the grooves. For example, when the middle conduit section 82B is retracted and the outer boom section 80A is extended, the plugs 125 will be positioned at the inner ends of the grooves. Alternatively, when both the middle conduit section 82B and the outer boom section 80A are fully retracted, the plugs 125 will be positioned at the outer ends of the grooves.

Thus the machine 20 includes a support vehicle 22, a hopper 40 mounted on the vehicle 22, a blower assembly 60 for maintaining a sub-atmospheric pressure in the hopper 40, an extendable/retractable boom 24 rotatably mounted on the vehicle 22, a worker-supporting bucket 96 attached to the outer end of the boom 24, and a conduit system 26 extending from the bucket 96, through the boom 24, and into the hopper 40 whereby fruit may be transferred from the bucket 96 to the hopper 40. The boom includes outer, middle and inner telescopically slidable boom sections 80A, 80B, and 80C; and the conduit system includes outer, middle and inner telescopically slidable conduit sections 82A, 82B, and 82C. The outer end of the outer conduit section 82A is fixedly mounted to the outer end of the outer boom section 80A and the inner end of the inner conduit 82C is fixedly mounted to the inner end of the inner boom section 80C. The boom sections and conduit sections respectively increase in size from the outer section to the inner section. The machine 20 further comprises a first deflection-preventing member 130 which is mounted on the inner end of the middle boom section 80B; and a plug groove assembly which includes plugs 125 mounted on the outer end of the middle conduit section 82B and corresponding grooves, positioned on the outer boom section 80A, for respectively slidably receiving the plugs 125.

Figure 17:
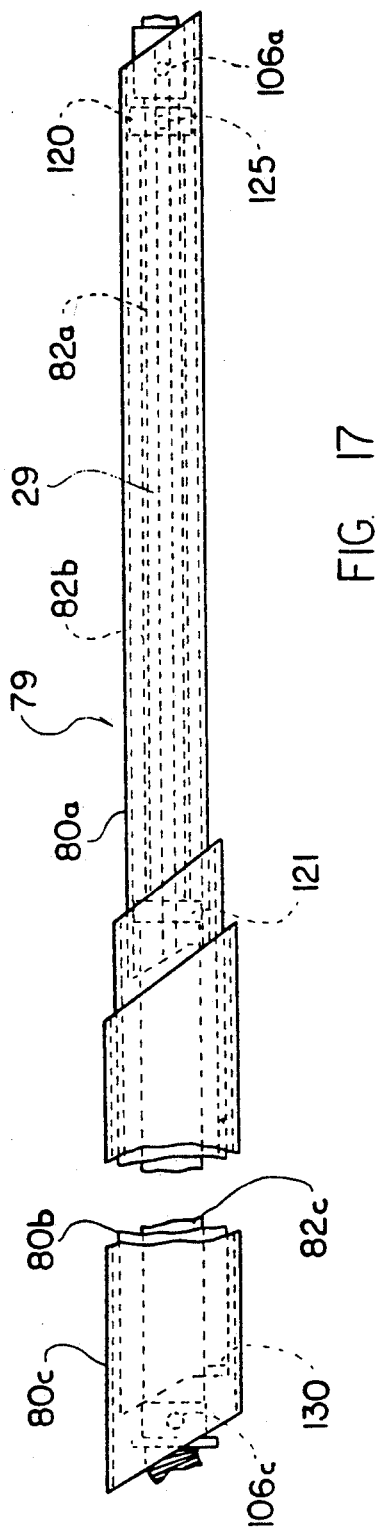
FIG. 17 is a schematic illustration of a certain extension pattern of the extendable/retractable boom which is particularly relevant in the present invention.

A complication which is now contemplated with the machine 20 relates to the supporting of the upper conduit arm 29 when the boom 24 is in a particular extension/retraction pattern. This particular extension/retraction pattern is shown schematically in FIG. 17 and occurs when:

(i.) the middle boom section 80B is fully retracted relative to the inner boom section 80C;
(ii.) the outer boom section 80A is fully extended relative to the middle boom section 80B;
(iii.) the middle conduit section 82B is fully extended relative to the inner conduit section 82C; and
(iv.) the outer conduit section 82A is fully retracted relative to the middle conduit section 82B, but fully extended relative to the inner conduit section 82C.

In such an extension pattern, the upper conduit arm 29 is supported at only two points: its outer end and its inner end. More specifically, the inner conduit section 82C is fixedly secured to the inner end of the inner boom section 80C by studs 106C and it is also supported at this point by the first deflection-preventing member 130. The outer conduit section 82A is fixedly secured to the outer end of the outer boom section 80A by studs 106A and it is also supported at its outer end by the plugs 125 which are positioned at the outer ends of the corresponding longitudinal grooves. Consequently, this extension/retraction pattern leaves the central portion of the upper conduit arm 29 without support thereby increasing the probability of premature failure. This problem may be aggravated by the weight of the bulky coupling 121 between the inner conduit section 82C and the outer conduit section 82A.

Figure 18A:
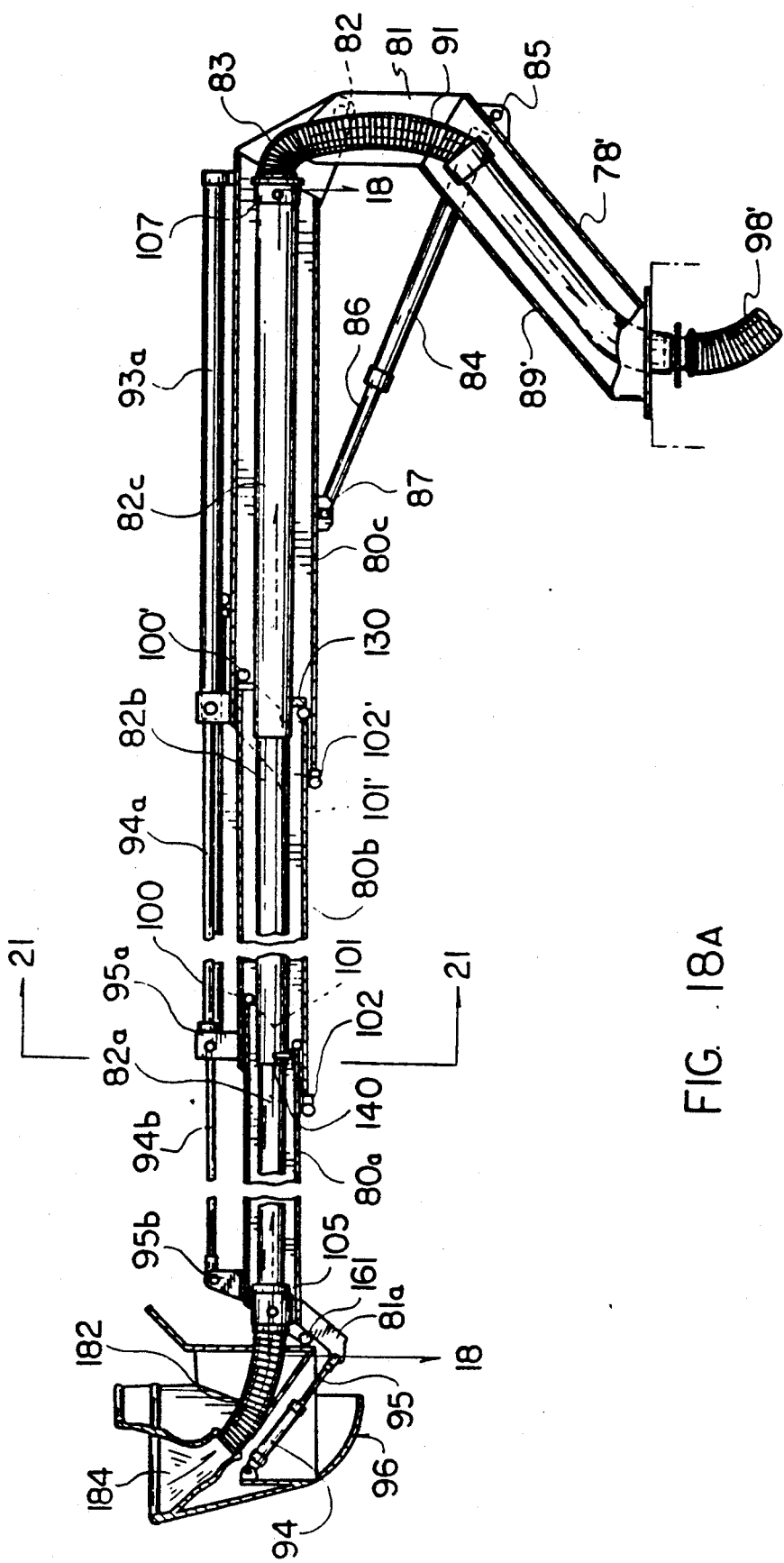
FIG. 18A is an enlarged cross section of the machine of FIG. 1 after being modified according to the present invention; the extendable/retractable boom being shown in an extended condition.
Figure 18B:
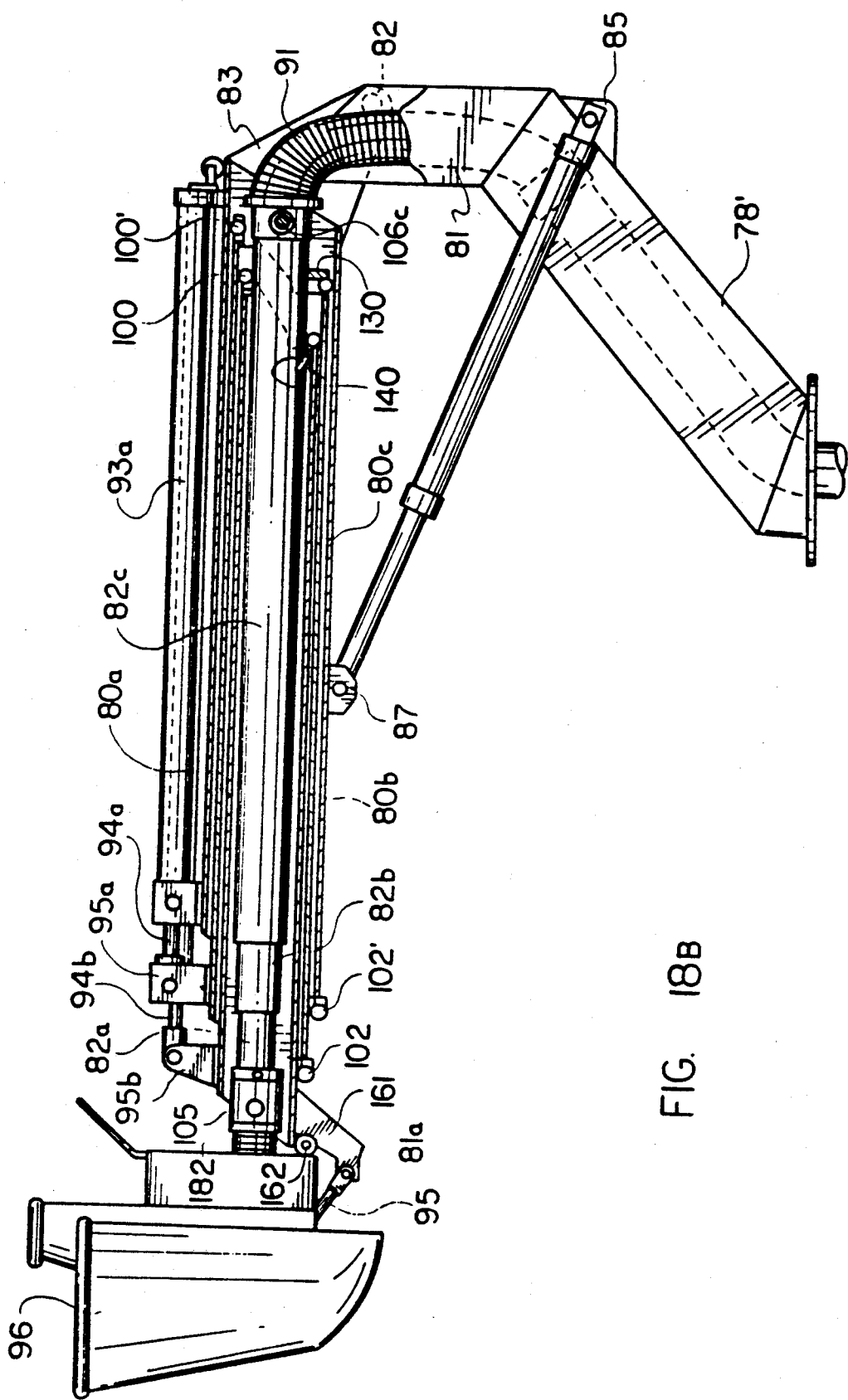
FIG. 18B is a view similar to FIG. 17A but showing the boom in a retracted condition.

Turning now to FIGS. 18A and 18B, the machine 20 is shown modified according to the present invention. These modifications include replacing the couplings 120 and 121 with a series of strategically arranged and sized shoulders. Additionally, a second deflection-preventing member 140 is provided to slidably support the middle conduit section 82B during the above-described and other extension/retraction patterns. This second deflection-preventing member 140 may be used instead of the plugs 125 and grooves, or may be used in addition to these components as a back-up support.

Figure 19:
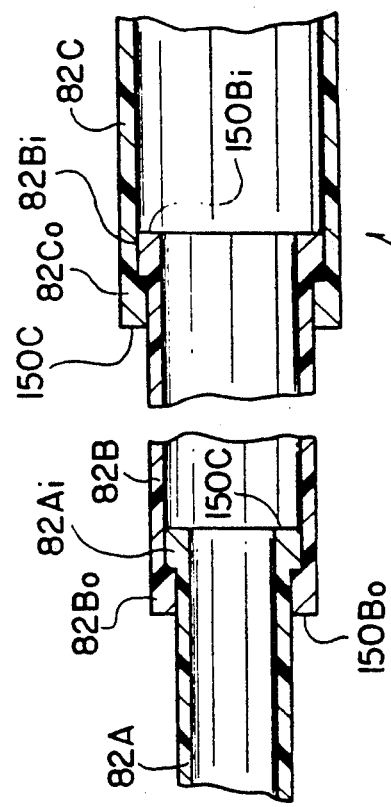
FIG. 19 is a cross-sectional view of the upper conduit arm as modified by the present invention, the relevant conduit sections being shown isolated from the rest of the machine and in a fully extended condition.

Examining initially the raised shoulders which replace the couplings 120 and 121, they are best explained by referring to FIG. 19 which shows the conduit sections 82A, 82B and 82C in a fully extended condition. As shown, the outer end $82C_o$ of the inner conduit section 82C includes a radially inwardly extending shoulder 150C surrounding its interior surface, while the inner end $82B_i$ of the middle conduit section 82B includes a radially outwardly extending shoulder $150B_i$ surrounding its exterior surface. The shoulders 150C and $150B_i$ are of strategically sized so that the "unshouldered" portion of the middle conduit 82B may be smoothly telescoped through the outer conduit 82C, however, once shoulder $150B_i$ encounters the shoulder 150C further movement will be prohibited. Thus, the shoulder 150C and the shoulder $150B_i$ prevent the middle conduit section 82B from being extended beyond the outer end $82C_o$ of the inner conduit 82C.

Additionally, the outer end $82B_o$ of the middle conduit section 82B includes a radially inwardly extending shoulder $150B_o$ surrounding its interior surface, while the inner end $82A_i$ of the outer conduit 82A includes a radially inwardly extending shoulder 150A surrounding its exterior surface. Once again these shoulders are strategically sized so that the "unshouldered" portion of the outer conduit 82A may be smoothly telescoped through the middle conduit section 82B, however, once the shoulder 150A encounters the shoulder $150B_o$ further movement will be prohibited. Thus the shoulders $150B_o$ and 150A prevent the outer conduit section 82A from being extended beyond the outer end 82B of the middle section conduit 82B.

One may appreciate that the above-described shoulder configuration eliminates the need for the bulky couplings 120 and 121. The elimination of couplings 120 and 121 removes obstructions on the exterior of the conduits and allows for the inclusion of the second deflection-preventing member 140 in the machine 20.

Figure 20A:
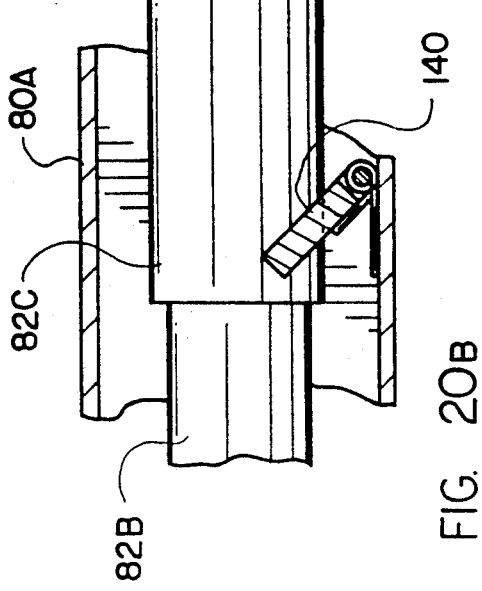
FIG. 20A is a side view of certain isolated components of the boom and the conduit system with one embodiment of a second deflection-preventing member according to the present invention incorporated in the machine, the second deflection-preventing member being shown in a normal transverse position whereat it forms a cradle for the middle conduit section.
Figure 20B:
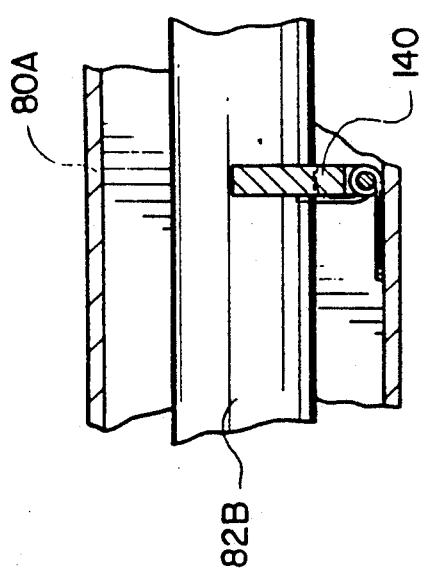
FIG. 20B is a side view of certain isolated components of the boom and the conduit system with the second deflection-preventing member of FIG. 20A incorporated in the machine, the deflection-preventing member being shown in pivoted position whereby the member may accommodate the inner conduit section.
Figure 21:
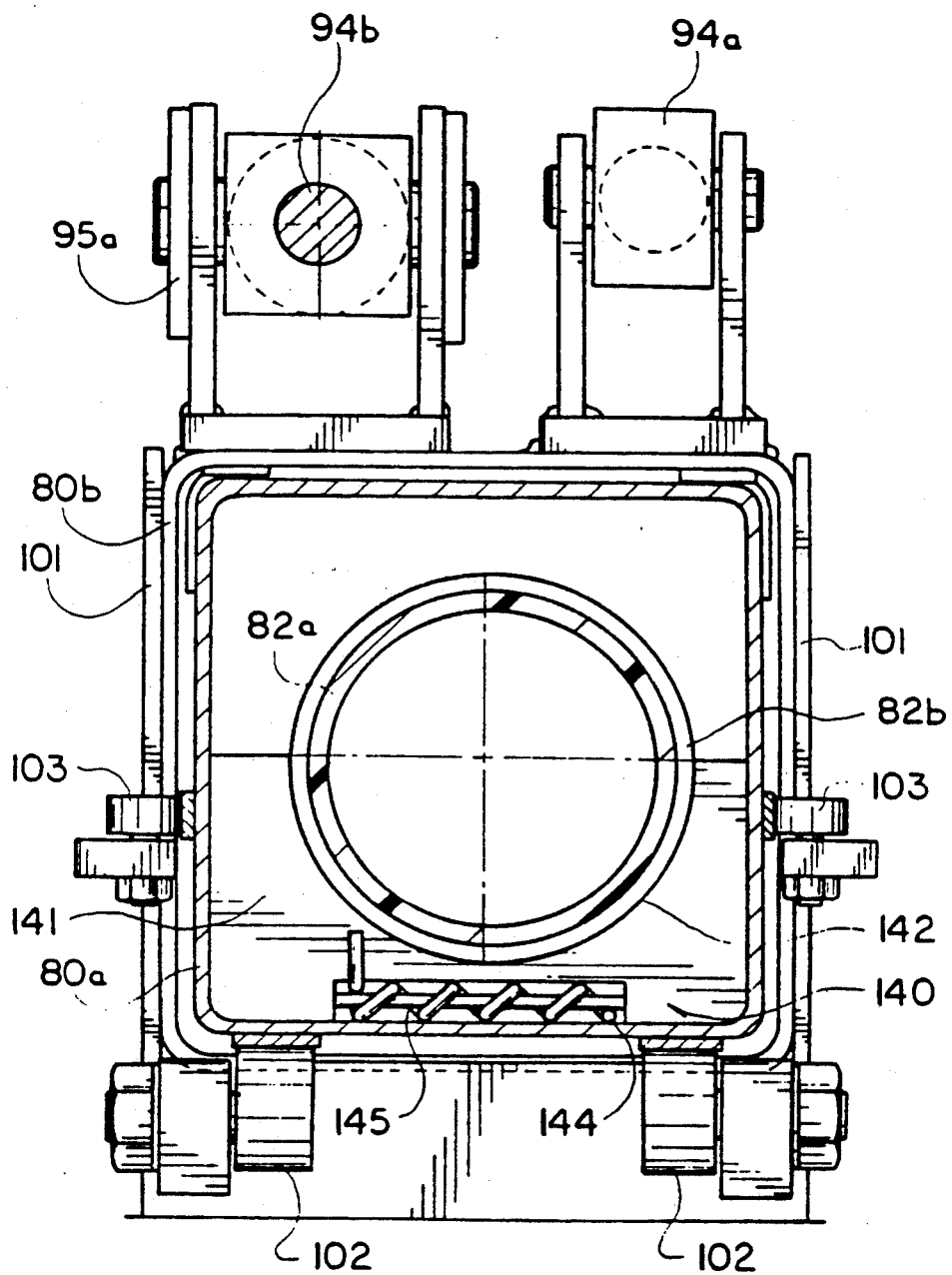
FIG. 21 is an enlarged plan sectional view taken on line 21—21 of FIG. 18A, partly broken away, with certain components omitted for the sake of clarity.

Examining now the second deflection-preventing member 140, one embodiment of this component is shown in FIGS. 20A, 20B and 21. As is best shown in FIG. 21, this embodiment of the second deflection-preventing member 140 comprises a plate-shape main body portion 141 having an arcuate edge 142 sized to form a cradle for the middle conduit section 82B. The main body portion 141 also includes an opposite edge which is pivotally attached, as by hinge 144, to the inner end of the outer boom section 80A. The transverse deflection-preventing member 140 is spring-loaded, as by spring 145, whereby the deflection-preventing member 140 is biased to a normal transverse position as shown in FIGS. 20A and 21.

The pivotal attachment of the second deflection-preventing member 140 to the outer boom section 80A accommodates the extension and retraction of the boom section during operation of the harvesting machine 20. For example, in certain extension patterns, the outer boom section 80A actually surrounds the inner conduit section 82C. As explained above, the inner boom section 82C is preferably of a larger size than the middle boom section 82B, and as such, the arcuate edge 142 of the deflection-preventing member 140 will be too small to accommodate the inner conduit section 82C. To allow the inner boom section 80A to slide past the outer conduit section 82C, as is necessary to retract the boom sections, the deflection-preventing member 140 is pivoted as shown in FIG. 20B. Once the inner conduit section is cleared during the extension process, the deflection-preventing member 140 is returned to the transverse position shown in FIG. 20A. In this transverse position, the arcuate edge 142 will closely cradle the middle conduit section 82B thereby supporting the same.

Figure 22:
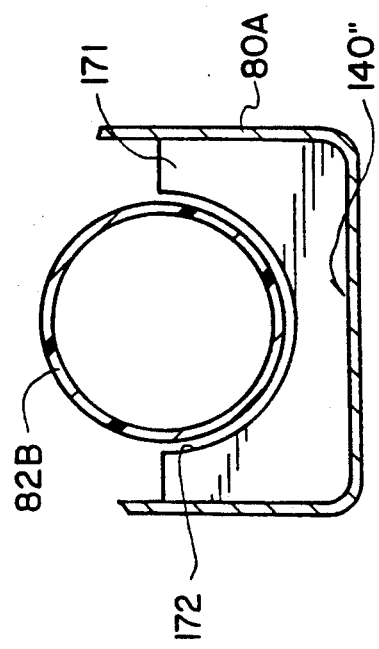
FIG. 22 is an enlarged view of another embodiment of a second deflection-preventing member according to the present invention, the outer boom section and the middle conduit section being shown in section while the deflection-preventing member is shown in plan.

Another embodiment of the second deflection-preventing member is shown in FIG. 22. In this embodiment, the member 140' comprises an spool-shaped elastomeric body 160 supported on a shaft 161 which is attached to the inner end of the outer boom section 80A. The spool-shaped body 160 is sized so that when the member 140' is positioned adjacent the middle conduit section 82B, the outer surface 162 of the body 160 will closely conform to the shape of this section. As such, the outer surface 162 may be viewed as an arcuate edge which is sized to form a cradle for the middle conduit section 82B. Additionally, the body 160 is chosen so that its elastomeric properties will allow the deformation necessary to accommodate the wider inner conduit section 80C when the member 140' is positioned adjacent this section 80C.

Figure 23:
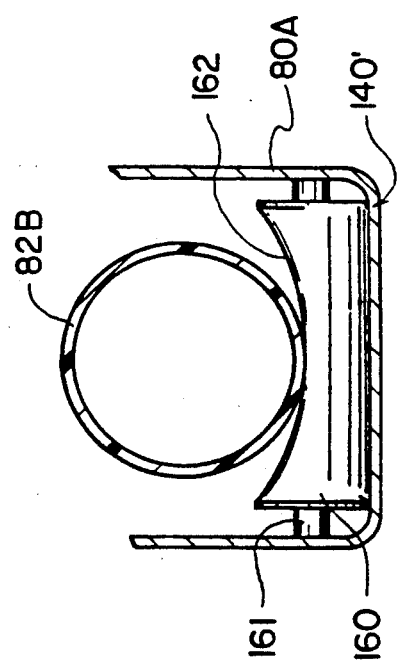
FIG. 23 is an enlarged view of yet another embodiment of a deflection-preventing member according to the present invention, the outer boom section and the middle conduit section being shown in section while the deflection-preventing member is shown in plan.

Still another embodiment of the second deflection-preventing member is shown in FIG. 23. In this embodiment, the member 140" comprises a plate-shape main body portion 171 having an arcuate edge 172. The arcuate edge 172 is sized to form a cradle for the inner conduit section 82C. Consequently, when the deflection-preventing member 140" is positioned adjacent the middle conduit section 82B, as is shown in FIG. 23, a gap will exist between the member 140" and the conduit section 82B. Thus, in this embodiment, the deflection-preventing member 140" does not absolutely support the middle conduit as in the above-described embodiments. Instead, this deflection-preventing member 140" allows only a limited deflection of the middle conduit section 80B, this limited deflection being approximately equal to half the difference between the diameters of the inner conduit section 80C and the outer conduit section 80B. Although not specifically shown in the drawings, the deflection-preventing member 140" should be pivotally mounted to allow the transition between the middle boom section 80B and the inner boom section 80C during the retraction process.

One may now appreciate that the present invention provides a machine for harvesting fruit from trees which is believed to provide adequate support for the upper conduit arm in essentially all extension/retraction patterns and the required support is provided without interfering with the ability of the boom to telescope in the intended manner.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. A machine for harvesting fruit from trees comprising:
 a supporting vehicle;
 a hopper mounted on the vehicle;
 blower means for maintaining a sub-atmospheric pressure in said hopper;

an extendable/retractable boom rotatably mounted on said vehicle; said boom including inner, middle and outer telescopically slidable boom sections; said boom sections increasing in transverse size from the outer section to the inner section;

a worker-supporting bucket attached to the outer section of said boom;

a conduit system extending from said bucket, through said boom, and into said hopper whereby fruit may be transferred from said bucket to said hopper; said conduit system including inner, middle and outer telescopically slidable conduit sections;

said boom sections and said conduit sections each having an inner end, an outer end, an interior surface and an exterior surface;

said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;

a first deflection-preventing member mounted on the inner end of said middle boom section, said first deflection-preventing member comprising means for preventing deflection of said inner conduit section relative to said middle boom section;

a second deflection-preventing member mounted on the interior surface of the inner end of said outer boom section, said second deflection-preventing member comprising means for preventing deflection of said middle and outer conduit sections relative to said outer boom section and means for accommodating both said inner conduit section and said middle conduit section at various extension/retraction patterns; and a plug groove assembly which includes a set of plugs mounted on the outer end of said middle conduit section and a corresponding set of grooves, positioned on said outer boom section, for slidably receiving said set of plugs.

2. A machine as set forth in claim 1 further comprising first shoulder means, positioned on said outer conduit section and said middle conduit section, for permitting relative sliding movement between the outer and middle conduit sections but limiting the outer extension of said outer conduit section relative to said middle conduit section; the machine also further comprising second shoulder means, positioned on said middle conduit section and said inner conduit section, for permitting relative sliding movement between said middle conduit section and said inner conduit section but limiting the outer extension of said middle conduit section relative to said inner conduit section.

3. A machine as set forth in claim 2 wherein said first shoulder means includes a first shoulder extending radially inwardly from the interior surface of the outer end of said middle conduit section and a second shoulder extending radially outwardly form the exterior surface of the inner end of said outer conduit section whereby said first shoulder and said second shoulder will engage each other to limit outer extension movement between said middle conduit section and said outer conduit section.

4. A machine as set forth in claim 3 wherein said second shoulder means includes a third shoulder extending radially inwardly form the interior surface of the outer end of said inner conduit section and a fourth shoulder extending radially outwardly form the exterior surface of the inner end of said middle conduit section whereby said third shoulder and said fourth shoulder will engage each other to limit outer extension movement between said middle conduit section and said outer conduit section.

5. A machine for harvesting fruit from trees comprising:

a supporting vehicle;

a hopper mounted on the vehicle;

blower means for maintaining a sub-atmospheric pressure in said hopper;

an extendable/retractable boom rotatably mounted on said vehicle; said boom including inner, middle and outer telescopically slidable boom sections; said boom sections increasing in transverse size from the outer section to the inner section;

a worker-supporting bucket attached to the outer section of said boom;

a conduit system extending from said bucket, through said boom, and into said hopper whereby fruit may be transferred from said bucket to said hopper; said conduit system including inner, middle and outer telescopically slidable conduit sections;

said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;

a first deflection-preventing member mounted on the inner end of said middle boom section;

a second deflection-preventing member mounted on the inner end of said outer boom section; and a plug groove assembly which includes a set of plugs mounted on the outer end of said middle conduit section and a corresponding set of grooves, positioned on said outer boom section, for slidably receiving said set of plugs;

wherein said second deflection-preventing member comprises a plate-shape main body portion having an arcuate edge which is sized to form a cradle for said middle conduit section, and an opposite edge which is pivotally attached to said inner end of said outer boom section.

6. A machine as set forth in claim 5 wherein said second deflection-preventing member is biased to a normal transverse position.

7. A machine for harvesting fruit from trees comprising:

a supporting vehicle;

a hopper mounted on the vehicle;

blower means for maintaining a sub-atmospheric pressure in said hopper;

an extendable/retractable boom rotatably mounted on said vehicle; said boom including inner, middle and outer telescopically slidable boom sections; said boom sections increasing in transverse size from the outer section to the inner section;

a worker-supporting bucket attached to the outer section of said boom;

a conduit system extending from said bucket, through said boom, and into said hopper whereby fruit may be transferred from said bucket to said hopper; said conduit system including inner, middle and outer telescopically slidable conduit sections;

said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;

a first deflection-preventing member mounted on the inner end of said middle boom section;

a second deflection-preventing member mounted on the inner end of said outer boom section; and a plug groove assembly which includes a set of plugs mounted on the outer end of said middle conduit section and a corresponding set of grooves, positioned on said outer boom section, for slidably receiving said set of plugs;

wherein said second deflection-preventing member comprises a spool-shaped elastomeric body supported on a shaft which is attached to the inner end of said outer boom section; said spool-shaped body including an arcuate edge which is sized, when in an undeformed state, to form a cradle for said middle conduit section; said spool-shaped body possessing elastomeric properties such that it will allow the deformation necessary to accommodate said inner conduit section.

8. A machine for harvesting fruit from trees comprising:

a supporting vehicle;

a hopper mounted on the vehicle;

blower means for maintaining a sub-atmospheric pressure in said hopper;

an extendable/retractable boom rotatably mounted on said vehicle; said boom including inner, middle and outer telescopically slidable boom sections; said boom sections increasing in transverse size from the outer section to the inner section;

a worker-supporting bucket attached to the outer section of said boom;

a conduit system extending from said bucket, through said boom, and into said hopper whereby fruit may be transferred from said bucket to said hopper; said conduit system including inner, middle and outer telescopically slidable conduit sections;

said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;

a first deflection-preventing member mounted on the inner end of said middle boom section;

a second deflection-preventing member mounted on the inner end of said outer boom section; and a plug groove assembly which includes a set of plugs mounted on the outer end of said middle conduit section and a corresponding set of grooves, positioned on said outer boom section, for slidably receiving said set of plugs;

wherein said second deflection-preventing member comprises a plate-shape main body portion having an arcuate edge sized to form a cradle for said outer conduit section;

9. A machine for harvesting fruit from trees comprising:

a supporting vehicle;

a hopper mounted on the vehicle;

blower means for maintaining a sub-atmospheric pressure in said hopper;

an extendable/retractable boom rotatably mounted on said vehicle; said boom including inner, middle and outer telescopically slidable boom sections; said boom sections increasing in transverse size from the outer section to the inner section;

a worker-supporting bucket attached to the outer section of said boom;

a conduit system extending from said bucket, through said boom, and into said hopper whereby fruit may be transferred from said bucket to said hopper; said conduit system including inner, middle and outer telescopically slidable conduit sections;

said boom sections and said conduit sections each having an inner end, an outer end, an interior surface and an exterior surface;

said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;

a first deflection-preventing member mounted on the inner end of said middle boom section, said first deflection-preventing member comprising means for preventing deflection of said inner conduit section relative to said middle boom section; and a second deflection-preventing member mounted on the interior surface of the inner end of said outer boom section, said second deflection-preventing member comprising means for preventing deflection of said middle and outer conduit sections relative to said outer boom section and means for accommodating both said inner conduit section and said middle conduit section at various extension/retraction patterns.

10. A machine as set forth in claim 9 wherein said conduit system further comprises boom-hopper conduit sections and coupling means for detachably connecting the inner end of said inner conduit section to said boom-hopper conduit sections; said coupling means being fixedly mounted to said inner boom section.

11. A machine as set forth in claim 9 wherein said hopper comprises a baffle system for distributing the weight of fruit transferred from said bucket to said hopper; said baffle system including a series of spaced apart baffle plates pivotally attached to said hopper for progressively supporting portions of the fruit.

12. A machine as set forth in claim 11 wherein said hopper further comprises means for moving it between a receiving position and a dumping position and wherein said baffle system further comprises stop means for supporting said baffle plates when said hopper is in said receiving position.

13. A machine as set forth in claim 12 wherein said baffle plates include peripheral edges having strategically placed indentations to allow gradual passage of fruit incoming into said hopper.

14. A machine as set forth in claim 9 further comprising first shoulder means, positioned on said outer conduit section and said middle conduit section, for permitting relative sliding movement between the outer and middle conduit sections but limiting the outer extension of said outer conduit section relative to said middle conduit section; the machine also further comprising second shoulder means, positioned on said middle conduit section and said inner conduit section, for permitting relative sliding movement between said middle conduit section and said inner conduit section but limiting the outer extension of said middle conduit section relative to said inner conduit section.

15. A machine as set forth in claim 14 wherein said first shoulder means includes a first shoulder extending radially inwardly form the interior surface of the outer end of said middle conduit section and a second shoulder extending radially outwardly from the exterior surface of the inner end of said outer conduit section whereby said first shoulder and said second shoulder will engage each other to limit outer extension movement between said middle and said outer conduit sections.

16. A machine as set forth in claim 15 wherein said second shoulder means includes a third shoulder extending radially inwardly from the interior surface of the outer end of said inner conduit section and a fourth shoulder extending radially outwardly form the exterior surface of the inner end of said middle conduit section whereby said third shoulder and said fourth shoulder will engage each other to limit outer extension movement between said middle conduit section and said outer conduit section.

17. A machine for harvesting fruit from trees comprising:
   a supporting vehicle;
   a hopper mounted on the vehicle;
   blower means for maintaining a sub-atmospheric pressure in said hopper;
   an extendable/retractable boom rotatably mounted on said vehicle; said boom including inner, middle and outer telescopically slidable boom sections; said boom sections increasing in transverse size from the outer section to the inner section;
   a worker-supporting bucket attached to the outer section of said boom;
   a conduit system extending from said bucket, through said boom, and into said hopper whereby fruit may be transferred from said bucket to said hopper; said conduit system including inner, middle and outer telescopically slidable conduit sections;
   said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;
   a first deflection-preventing member mounted on the inner end of said middle boom section; and
   a second deflection-preventing member mounted on the inner end of said outer boom section;
wherein said second deflection-preventing member comprises a plate-shape main body portion having an arcuate edge which is sized to form a cradle for said middle conduit section, and an opposite edge which is pivotally attached to said inner end of said outer boom section.

18. A machine for harvesting fruit from trees comprising:
   a supporting vehicle;
   a hopper mounted on the vehicle;
   blower means for maintaining a sub-atmospheric pressure in said hopper;
   an extendable/retractable boom rotatably mounted on said vehicle; said boom including inner, middle and outer telescopically slidable boom sections; said boom sections increasing in transverse size from the outer section to the inner section;
   a worker-supporting bucket attached to the outer section of said boom;
   a conduit system extending from said bucket, through said boom, and into said hopper whereby fruit may be transferred from said bucket to said hopper; said conduit system including inner, middle and outer telescopically slidable conduit sections;
   said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;
   a first deflection-preventing member mounted on the inner end of said middle boom section; and
   a second deflection-preventing member mounted on the inner end of said outer boom section;
wherein said second deflection-preventing member is biased to a normal transverse position.

19. A machine for harvesting fruit from trees comprising:
   a supporting vehicle;
   a hopper mounted on the vehicle;
   blower means for maintaining a sub-atmospheric pressure in said hopper;
   an extendable/retractable boom rotatably mounted on said vehicle; said boom including inner, middle and outer telescopically slidable boom sections; said boom sections increasing in transverse size from the outer section to the inner section;
   a worker-supporting bucket attached to the outer section of said boom;
   a conduit system extending from said bucket, through said boom, and into said hopper whereby fruit may be transferred from said bucket to said hopper; said conduit system including inner, middle and outer telescopically slidable conduit sections;
   said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;
   a first deflection-preventing member mounted on the inner end of said middle boom section; and
   a second deflection-preventing member mounted on the inner end of said outer boom section;
wherein said second deflection-preventing member comprises a spool-shaped elastomeric body supported on a shaft which is attached to the inner end of said outer boom section; said spool-shaped body including an arcuate edge which is sized, when in an undeformed state, to form a cradle for said middle conduit section; said spool-shaped body possessing elastomeric properties such that it will allow the deformation necessary to accommodate said inner conduit section.

20. A machine for harvesting fruit from trees comprising:
   a supporting vehicle;
   a hopper mounted on the vehicle;
   blower means for maintaining a sub-atmospheric pressure in said hopper;

an extendable/retractable boom rotatably mounted on said vehicle; said boom including inner, middle and outer telescopically slidable boom sections; said boom sections increasing in transverse size from the outer section to the inner section;

a worker-supporting bucket attached to the outer section of said boom;

a conduit system extending from said bucket, through said boom, and into said hopper whereby fruit may be transferred from said bucket to said hopper; said conduit system including inner, middle and outer telescopically slidable conduit sections;

said conduit sections increasing in transverse size from the outer section to the inner section; the outer end of said outer conduit section being fixedly mounted to the outer end of said outer boom section; and the inner end of said inner conduit section being fixedly mounted to the inner end of said inner boom section;

a first deflection-preventing member mounted on the inner end of said middle boom section; and a second deflection-preventing member mounted on the inner end of said outer boom section;

wherein said second deflection-preventing member comprises a plate-shape main body portion having an arcuate edge sized to form a cradle for said outer conduit section.

* * * * *